(12) United States Patent
Furuya et al.

(10) Patent No.: US 9,229,168 B2
(45) Date of Patent: Jan. 5, 2016

(54) SEMICONDUCTOR OPTICAL WAVEGUIDE DEVICE AND METHOD FOR MANUFACTURING THE SAME

(71) Applicant: SUMITOMO ELECTRIC INDUSTRIES, LTD., Osaka-shi, Osaka (JP)

(72) Inventors: Akira Furuya, Hadano (JP); Takamitsu Kitamura, Fujisawa (JP); Hideki Yagi, Machida (JP); Naoya Kono, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 26 days.

(21) Appl. No.: 14/198,261

(22) Filed: Mar. 5, 2014

(65) Prior Publication Data

US 2014/0254998 A1    Sep. 11, 2014

(30) Foreign Application Priority Data

Mar. 8, 2013    (JP) .................. 2013-046976

(51) Int. Cl.

| | |
|---|---|
| G02B 6/12 | (2006.01) |
| B82Y 20/00 | (2011.01) |
| G02B 6/30 | (2006.01) |
| G02B 6/122 | (2006.01) |
| G02F 1/225 | (2006.01) |
| G02B 6/136 | (2006.01) |
| G02F 1/017 | (2006.01) |
| G02F 1/21 | (2006.01) |

(52) U.S. Cl.
CPC .............. *G02B 6/305* (2013.01); *G02B 6/1228* (2013.01); *G02F 1/2257* (2013.01); *G02B 6/136* (2013.01); *G02B 2006/12078* (2013.01); *G02F 1/01708* (2013.01); *G02F 2001/212* (2013.01); *G02F 2001/217* (2013.01); *G02F 2201/04* (2013.01); *G02F 2201/06* (2013.01); *G02F 2201/063* (2013.01); *G02F 2201/12* (2013.01); *G02F 2202/101* (2013.01); *G02F 2202/102* (2013.01); *G02F 2202/108* (2013.01)

(58) Field of Classification Search
CPC .......... G02F 2201/06; G02F 2201/063; G02F 2201/12; G02F 2202/101; G02F 2202/102; G02F 2202/108; G02F 1/01708; G02F 1/2257; G02B 6/305; G02B 6/1228
USPC ...................... 385/128–131; 438/69
See application file for complete search history.

(56) References Cited

U.S. PATENT DOCUMENTS 6,310,995 B1    10/2001    Saini et al.

*Primary Examiner* — Akm Enayet Ullah
(74) *Attorney, Agent, or Firm* — Smith, Gambrell & Russell LLP.

(57) ABSTRACT

A semiconductor optical waveguide device includes a substrate having a first area and a second area, and first, second, and semiconductor mesas on the substrate. The first semiconductor mesa includes a cladding layer and a first mesa portion on the second area, the first mesa portion including first and second portions. The second semiconductor mesa includes an intermediate layer, a first core layer, and first and second mesa portions on the first and second areas, respectively. The third semiconductor mesa includes a second core layer, and first and second mesa portions having a greater width than that of the second semiconductor mesa. The first portion of the first semiconductor mesa has a substantially same width as the second mesa portion of the second semiconductor mesa. The first core layer is optically coupled to the second core layer through the intermediate layer disposed between the first and second core layers.

8 Claims, 38 Drawing Sheets

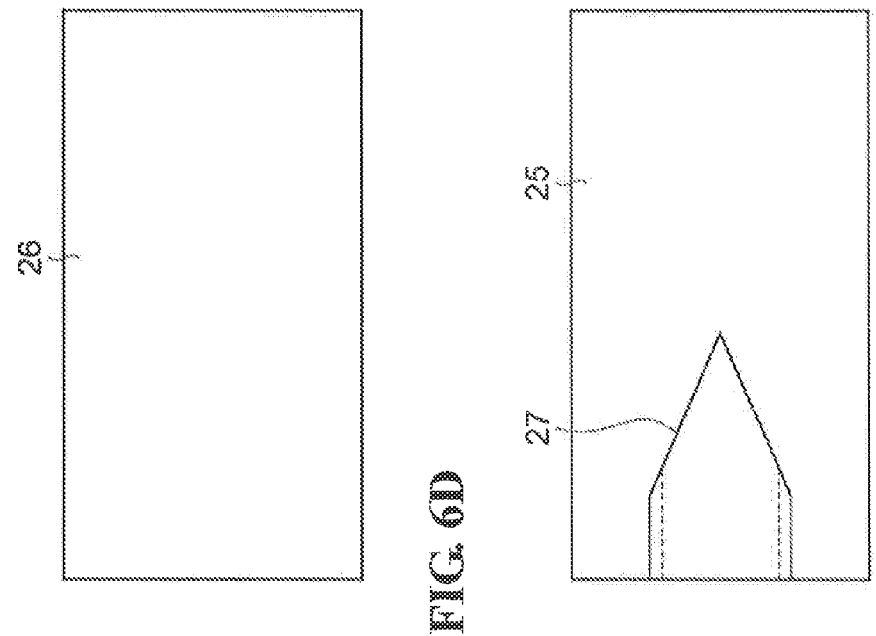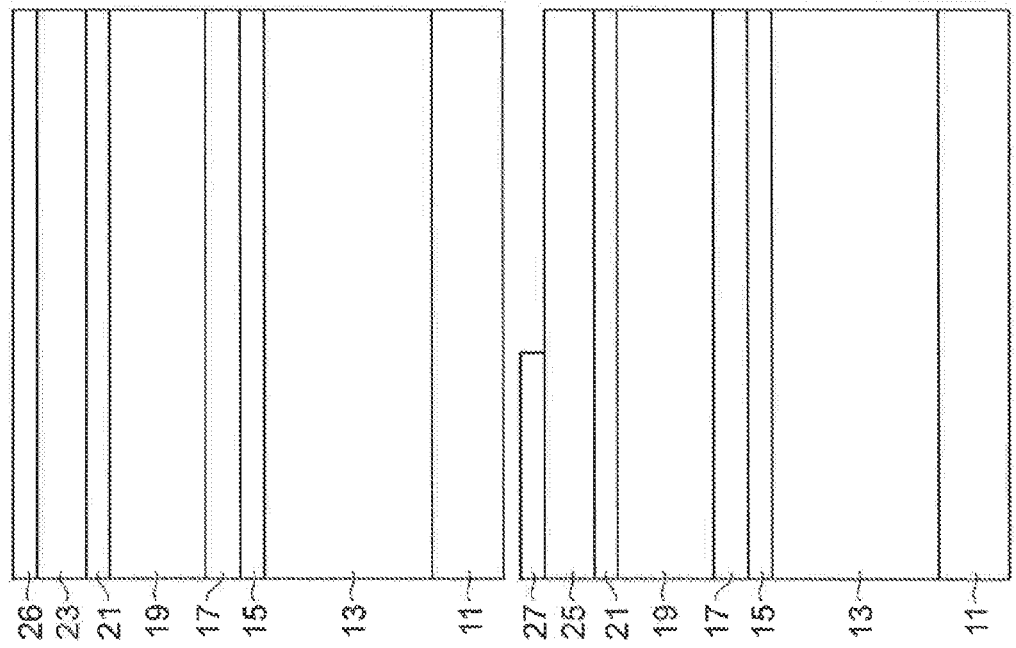

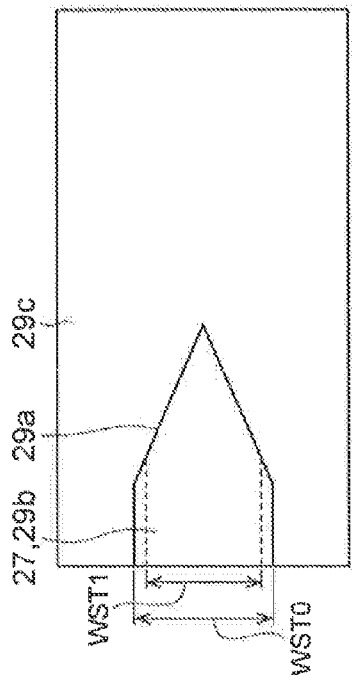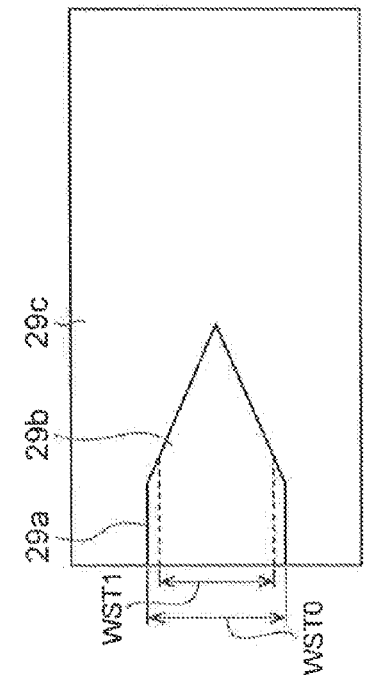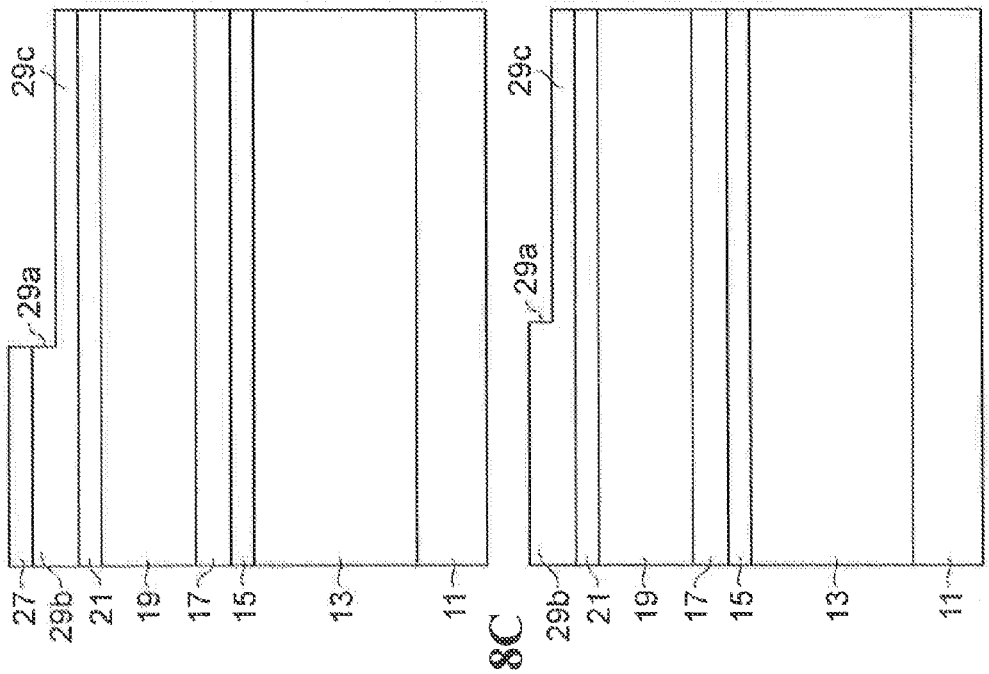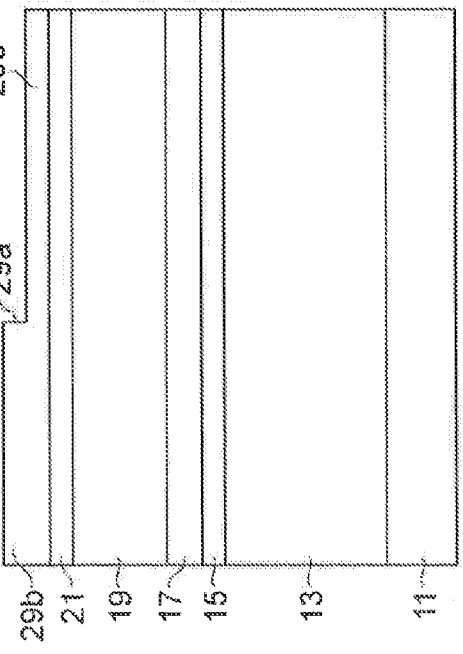

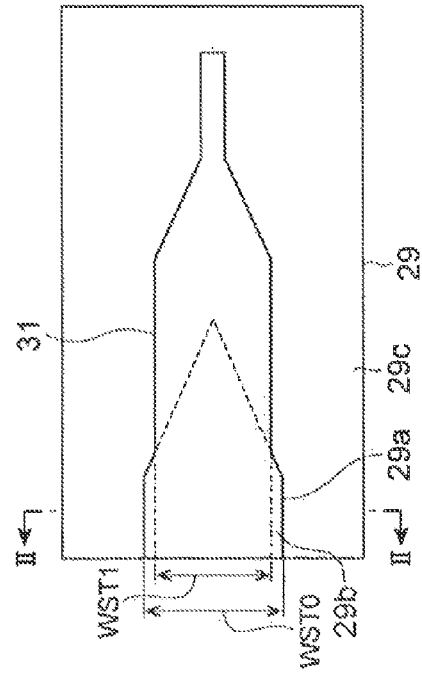
FIG. 11A
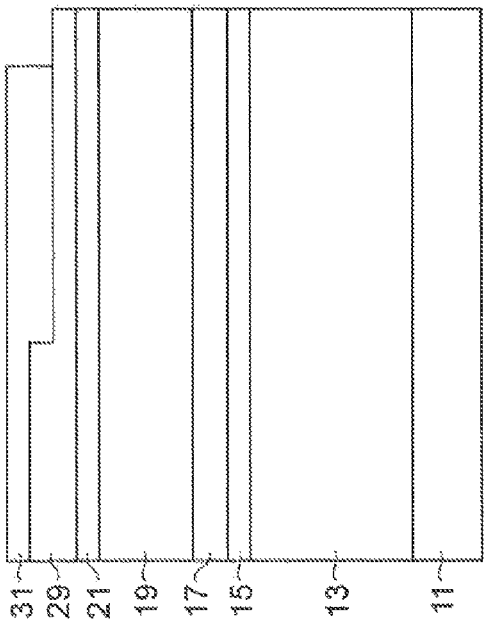
FIG. 11B
FIG. 11C
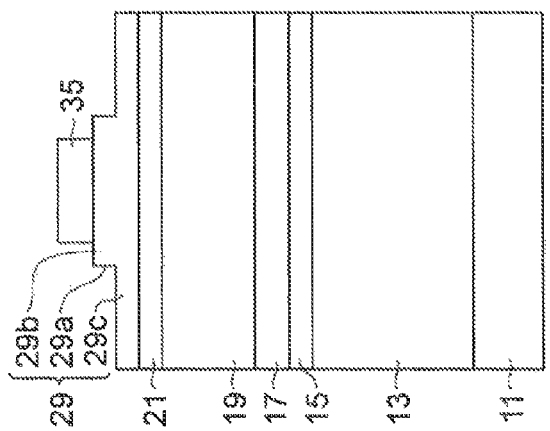

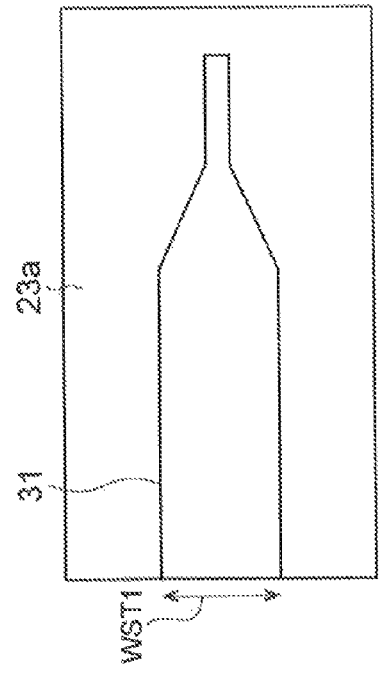
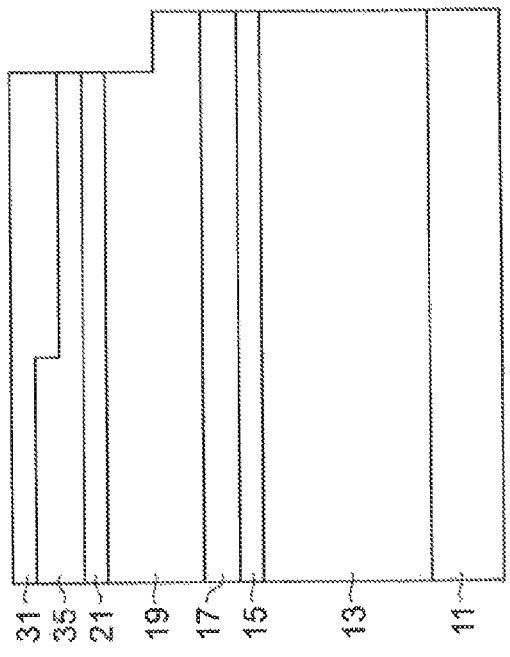
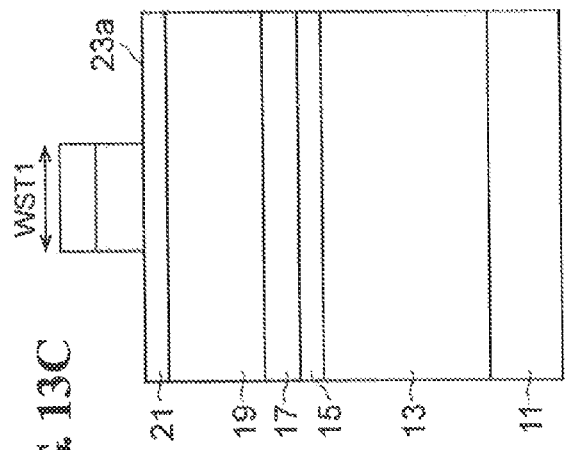

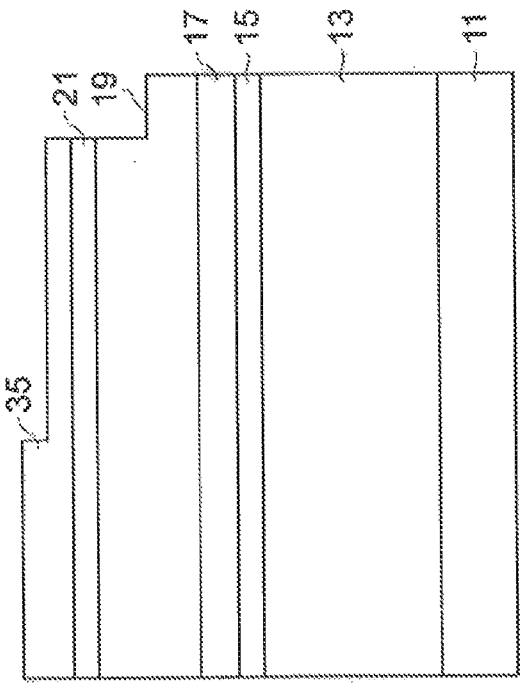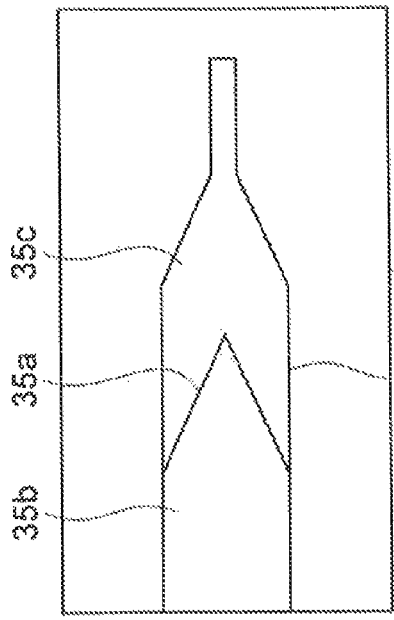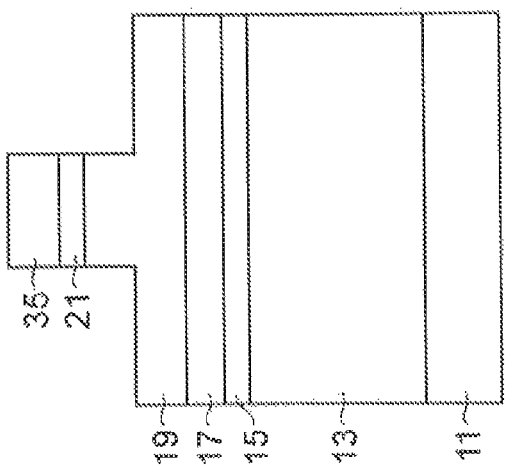

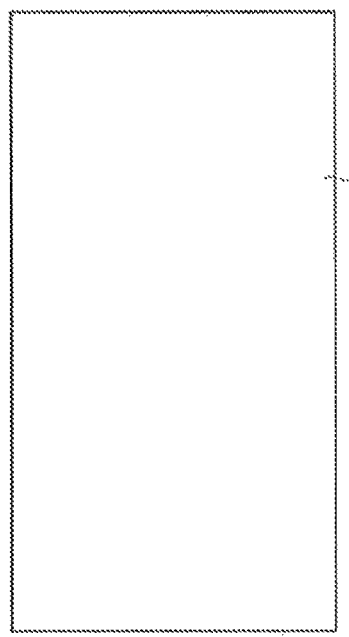
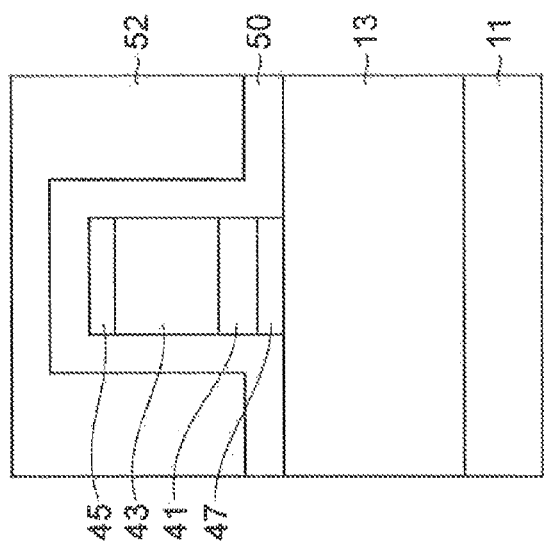
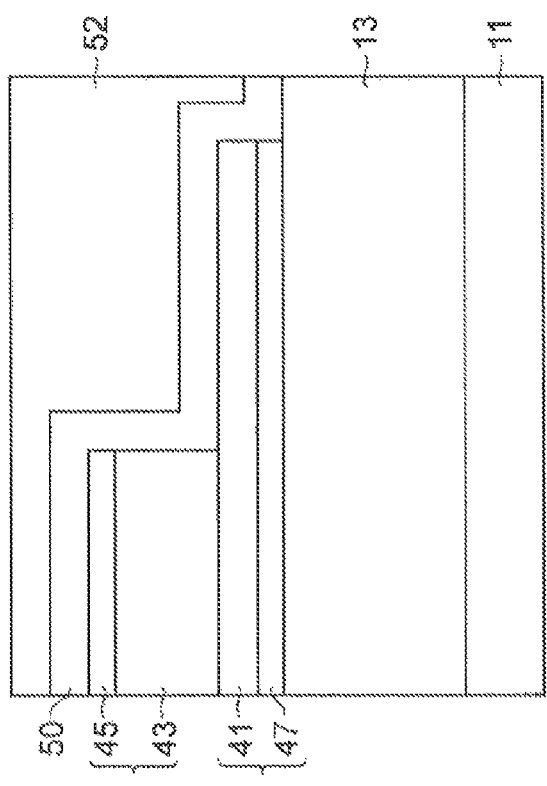

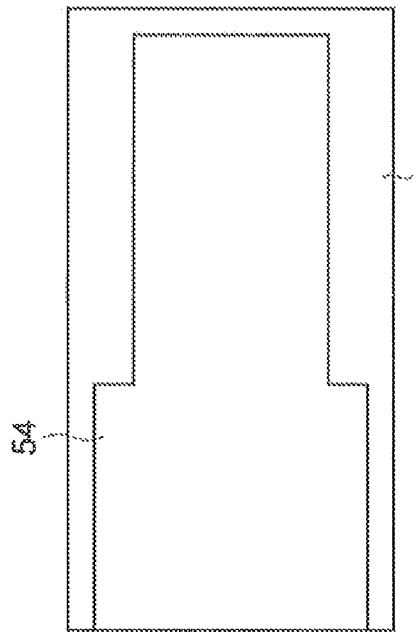
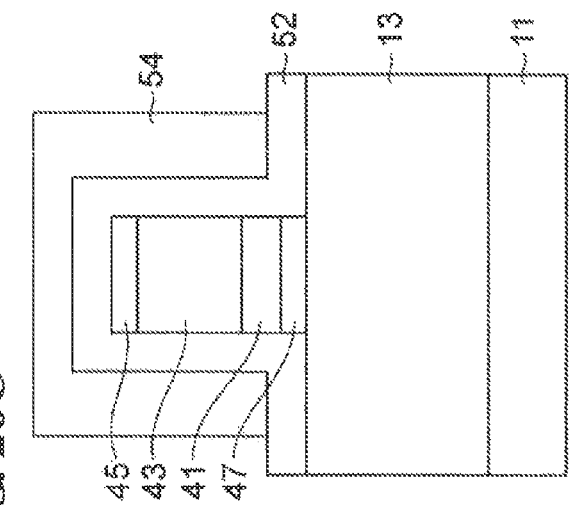
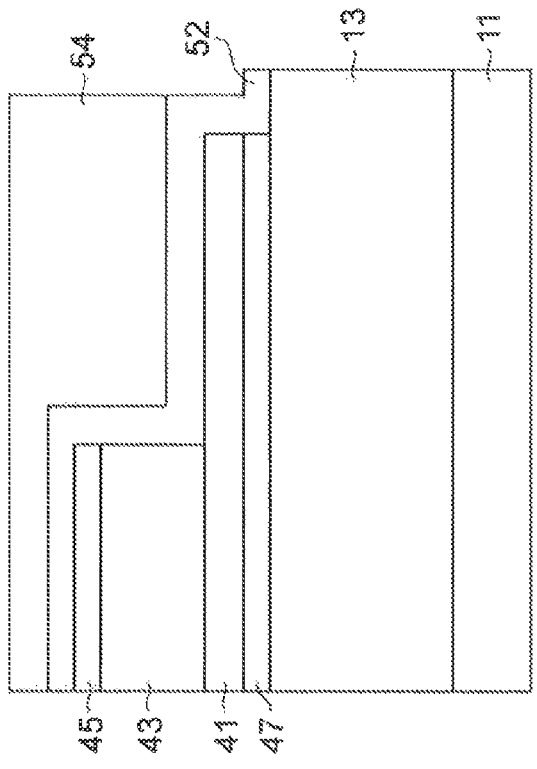

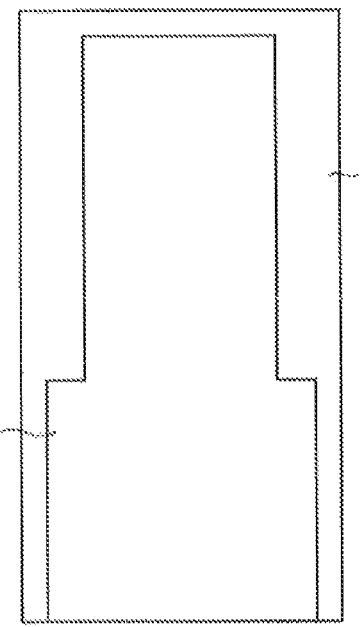
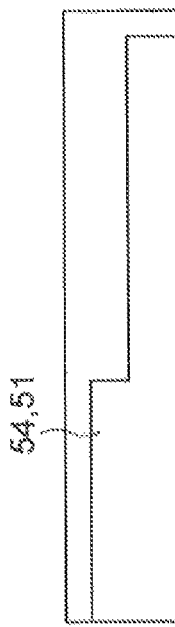
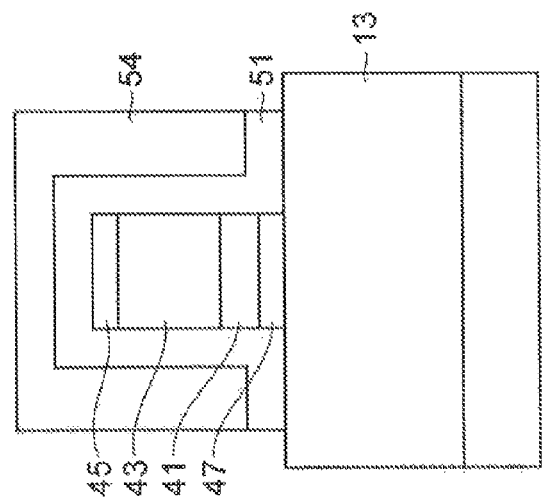
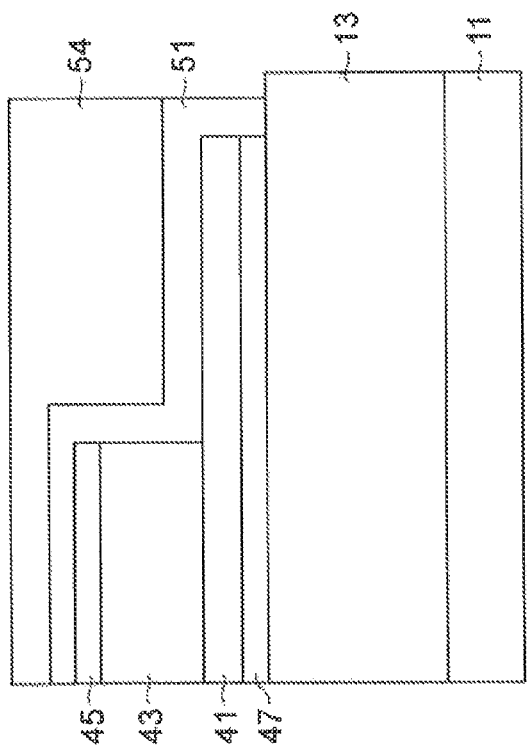

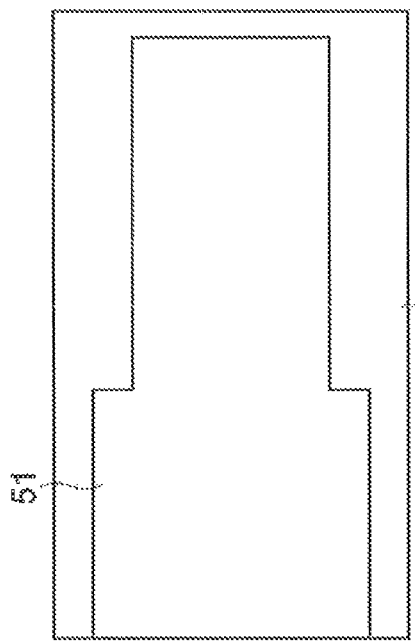
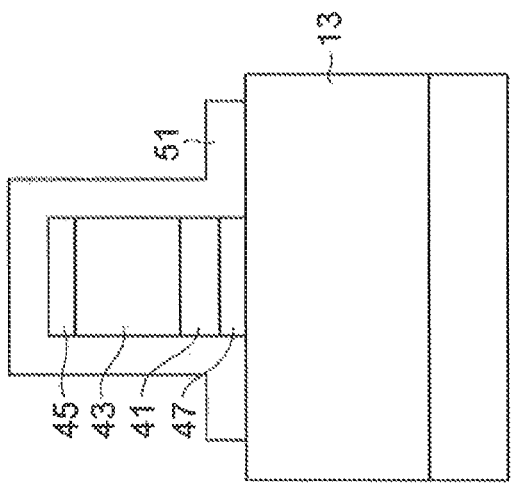
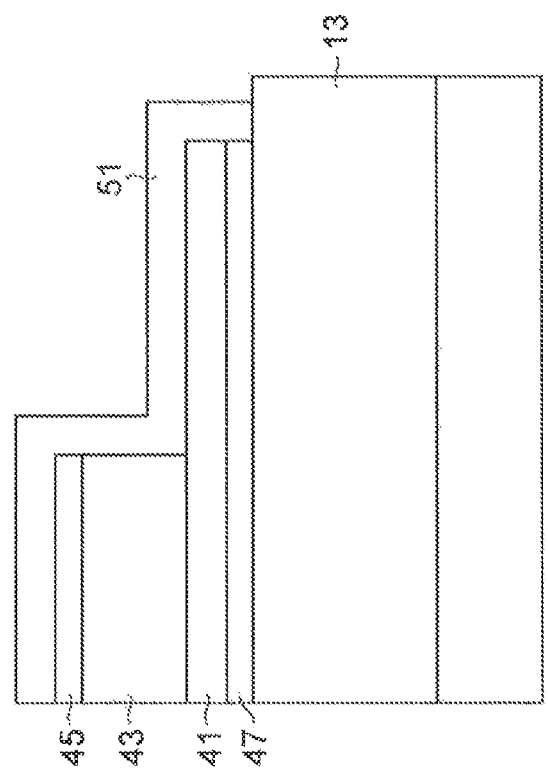

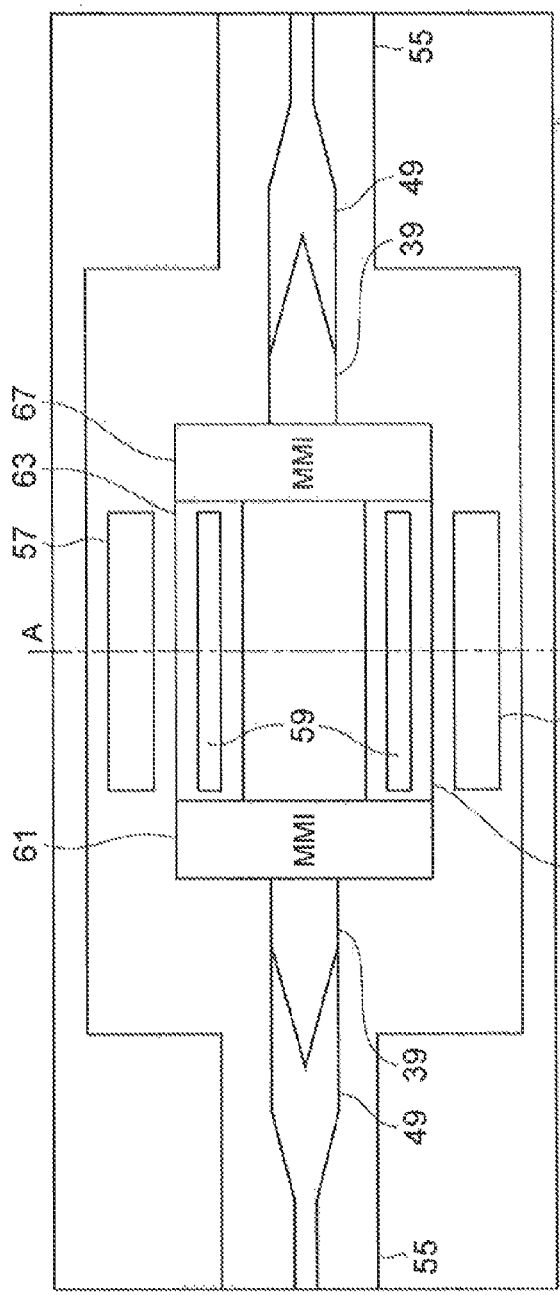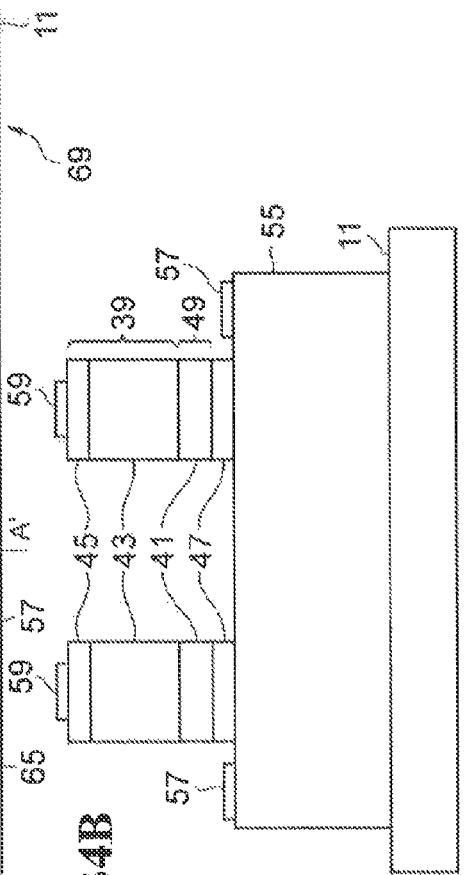

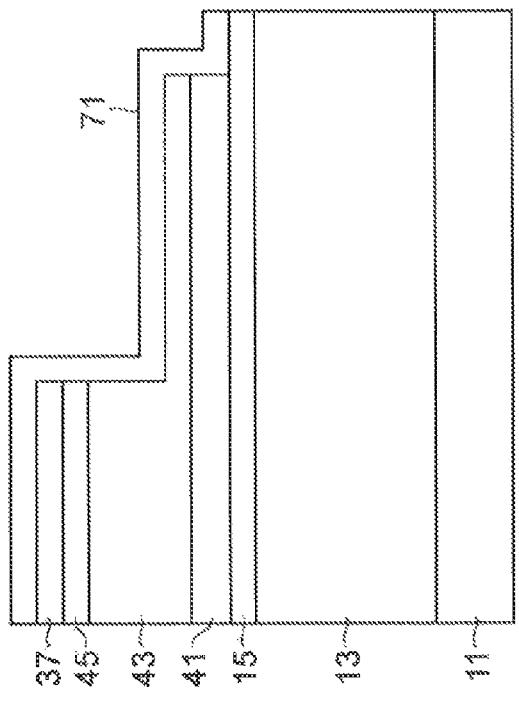
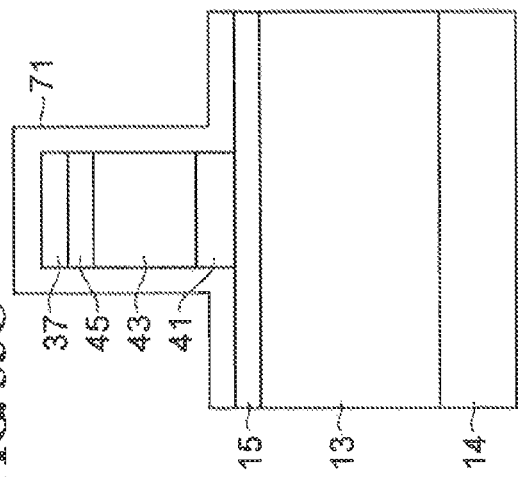
FIG. 35A
FIG. 35B
FIG. 35C

SEMICONDUCTOR OPTICAL WAVEGUIDE DEVICE AND METHOD FOR MANUFACTURING THE SAME

BACKGROUND OF THE INVENTION

1. Field of the Invention

The present invention relates to a semiconductor optical waveguide device and a method for manufacturing the semiconductor optical waveguide device.

2. Description of the Related Art

U.S. Pat. No. 6,310,995 discloses an optical waveguide device including a spot size converter.

III-V group compound semiconductors have a refractive index of 3 or more for light in a near-infrared wavelength band used in optical communication or optical information processing. In an optical waveguide formed of a III-V group compound semiconductor having such a high refractive index, optical propagation in a fundamental transverse mode through the optical waveguide requires an optical waveguide width of 2 or less. The half-width in a light distribution of a transverse mode confined in the optical waveguide is much less than 2 μm.

The optical waveguide device such as a semiconductor optical modulator is optically coupled to a single-mode optical waveguide (for example, an optical fiber). The half-width (mode field diameter (MFD)) of light distribution of a transverse mode propagating in the optical fiber ranges from 3 to 4 μm, for example. Thus, the half-width of light distribution of a transverse mode propagating in a semiconductor optical waveguide is significantly different from the half-width of light distribution of a transverse mode propagating in an optical fiber. This difference causes an optical coupling loss between the semiconductor optical waveguide and the optical fiber. In order to reduce the optical coupling loss, a structure for increasing the half-width of light distribution (increasing the spot size) in a transverse mode, for example, a spot size converter (SSC) is provided in an input/output portion of a semiconductor waveguide device.

In the spot size converter of the optical waveguide device described in U.S. Pat. No. 6,310,995, a plurality of optical waveguide structures are included in the stacking direction of a stacked semiconductor layer. The spot size converter performs transition of guided light from one of the optical waveguide structures to another optical waveguide structure in the stacking direction.

SUMMARY OF THE INVENTION

In the structure of the optical waveguide device described in U.S. Pat. No. 6,310,995, a stacked semiconductor layer of the optical waveguide structure in the stacking direction may be formed in a single step of epitaxial layer growth. However, a plurality of waveguide mesas are needed to be formed from the stacked semiconductor layer, in addition to a semiconductor optical waveguide having a waveguide width that allows optical coupling to a single-mode optical waveguide such as the optical fiber, another single-mode semiconductor optical waveguide having a different waveguide width is formed. A vertical mesa structure for stable optical propagation between optical waveguides in the stacking direction is required. In addition, a semiconductor mesa having a desired width is also required for control in a transverse mode. In the manufacture of this structure, these dimensions must be controlled with high precision and reproducibility.

More specifically, with reference to U.S. Pat. No. 6,310,995, this waveguide structure includes an upper semiconductor mesa, an intermediate semiconductor mesa, and a lower semiconductor mesa. The lower semiconductor mesa is optically-coupled to a single-mode optical waveguide such as a single-mode optical fiber (SMF). The upper semiconductor mesa and the intermediate semiconductor mesa constitute an optical waveguide in a semiconductor device. In the optical waveguide in the semiconductor device, however, the width of the upper semiconductor mesa is different from the width of the intermediate semiconductor mesa. More specifically, in this optical waveguide, the width of a core layer of the intermediate semiconductor mesa is different from the width of a cladding layer of the upper semiconductor mesa. However, the core layer of the intermediate semiconductor mesa is desired to have the same width as the cladding layer of the upper semiconductor mesa.

A semiconductor optical waveguide device according to a first aspect of the present invention includes (a) a substrate having a first area and a second area disposed along a first axis; (b) a first semiconductor mesa including a cladding layer and a first mesa portion disposed on the second area, the first mesa portion including a first portion and a second portion having a smaller width than the first portion; (c) a second semiconductor mesa disposed under the first semiconductor mesa, the second semiconductor mesa including an intermediate layer, a first core layer, a first mesa portion disposed on the first area, and a second mesa portion disposed on the second area; and (d) a third semiconductor mesa disposed between the Second semiconductor mesa and the substrate, the third semiconductor mesa including a second core layer, a first mesa portion disposed on the first area and a second mesa portion disposed on the second area, the first mesa portion of the third semiconductor mesa having an end face for receiving an input light. The first portion of the first semiconductor mesa has a substantially the same width as the second mesa portion of the second semiconductor mesa. Each of the first and second mesa portions of the third semiconductor mesa has a greater width than a width of the second semiconductor mesa, in addition, the first core layer is optically coupled to the second core layer through the intermediate layer disposed between the first core layer and the second core layer.

In the semiconductor optical waveguide device according to the first aspect of the present invention, preferably, the cladding layer is formed of a first III-V group compound semiconductor, and the intermediate layer is formed of a second III-V group compound semiconductor. In addition, preferably, the second III-V group compound semiconductor of the intermediate layer has a first conductive type, and the first III-V group compound semiconductor of the cladding layer has a second conductive type. In the semiconductor optical waveguide device, light propagating through the first core layer can be modulated by applying an electrical signal to the first core layer using an electrode disposed on the first semiconductor mesa, for example.

In the semiconductor optical waveguide device according to the first aspect of the present invention, preferably, the second mesa portion of the second semiconductor mesa and the first mesa portion of the first semiconductor mesa extend along the first axis. The second mesa portion of the second semiconductor mesa and the first mesa portion of the first semiconductor mesa preferably have a width of a single mode waveguide.

In the semiconductor optical waveguide device described above, the first mesa portion of the third semiconductor mesa has an end face for receiving an input light. Thus, the end face is optically-coupled to an external optical waveguide such as a single-mode optical fiber (SMF). Each of the first and second mesa portions of the third semiconductor mesa has a greater width than a width of the second semiconductor mesa. Thus, the mode field diameter of an optical waveguide in the third semiconductor mesa may be the same as or similar to the mode field diameter of the external optical waveguide. Therefore, a large optical coupling efficiency between the optical waveguide in the third semiconductor mesa and the external optical waveguide is obtained.

In the semiconductor optical waveguide device described above, each of the first and second mesa portions of the third semiconductor mesa has a greater width than a width of the second semiconductor mesa. The first core layer is optically-coupled to the second core layer. Thus, light propagates from the first core layer to the second core layer or from the second core layer to the first core layer.

In addition, the first core layer is optically-coupled to the second core layer through the intermediate layer. The first core layer is separated from the second core layer by the intermediate layer. Thus, the first core layer and the second core layer constitute different optical waveguide structures. Light guided through the first core layer is preferably processed (for example, is modulated) in such an optical waveguide structure.

The second mesa portion of the second semiconductor mesa and the first mesa portion of the first semiconductor mesa have a width of a single mode waveguide in which only a fundamental transverse mode can propagate. The first mesa portion of the first semiconductor mesa includes a first portion, which has substantially the same width as the second mesa portion of the second semiconductor mesa. Thus, the intermediate layer, the first core layer, and the cladding layer in the first portion of the first mesa portion of the first semiconductor mesa and the second mesa portion of the second semiconductor mesa constitute an optical waveguide structure having an approximately constant width. The first mesa portion of the first semiconductor mesa includes a second portion on the second mesa portion of the second semiconductor mesa. The second portion has a smaller width than the first portion of the first mesa portion. The narrow second portion terminates the optical waveguide without reflection of light passing through the first core layer at the end of the optical waveguide. Hence, the optical waveguide structure can stably perform optical waveguiding using the first core layer and optical processing using the first core layer.

The semiconductor optical waveguide device according to the first aspect of the present invention, preferably, includes a first electrode disposed on a surface of the second mesa portion of the third semiconductor mesa; and a second electrode disposed on a surface of the first semiconductor mesa. The first mesa portion of the third semiconductor mesa preferably has a smaller width than the second mesa portion of the third semiconductor mesa.

In the semiconductor optical waveguide device, light propagating through the first core layer is processed using the first electrode and the second electrode.

In the semiconductor optical waveguide device according to the first aspect of the present invention, preferably, the first core layer in the second mesa portion of the second semiconductor mesa constitutes an optical modulator that modulates light in response to an electrical signal applied through the first electrode and the second electrode.

In this semiconductor optical waveguide device, light propagating through the first core layer can be modulated using the first electrode and the second electrode.

In the semiconductor optical waveguide device according to the first aspect of the present invention, preferably the first mesa portion of the second semiconductor mesa includes a first portion, a tapered second portion, and a third portion. The first portion has a smaller width than the second mesa portion of the second semiconductor mesa. The tapered second portion has a width that gradually changes from the width of the first portion to the width of the second mesa portion of the second semiconductor mesa. In addition, the third portion has substantially the same width as the second mesa portion of the second semiconductor mesa.

In the semiconductor optical waveguide device, the first mesa portion of the second semiconductor mesa includes the first portion (having a smaller width than the second mesa portion of the second semiconductor mesa) and the second portion (a tapered portion having a width that gradually changes from the width of the first portion to the width of the second mesa portion of the second semiconductor mesa). This allows light to propagate easily between the first core layer and the second core layer.

In the semiconductor optical waveguide device according to the first aspect of the present invention, preferably, the substrate is formed of InP, the intermediate layer is formed of n-type InP, and the cladding layer is formed of p-type InP.

A method for manufacturing a semiconductor optical waveguide device according to a second aspect of the present invention, includes the steps of forming a stacked semiconductor layer on a substrate, the stacked semiconductor layer including a first III-V group compound semiconductor layer to be a cladding layer, a first semiconductor layer to be a first core layer, a second III-V group compound semiconductor layer to be an intermediate layer, and a second semiconductor layer to be a second core layer; forming a first insulating layer on the stacked semiconductor layer; forming a first mask on the first insulating layer; forming a patterned insulating layer including a first thick-film portion, a first thin-film portion, and a first level difference separating the first thick-film portion from the first thin-film portion by etching the first insulating layer using the first mask; forming a second mask on the patterned insulating layer; forming a first insulating layer mask by etching the patterned insulating layer using the second mask, the first insulating layer mask including a second thick-film portion, a second thin-film portion, and a second level difference that are formed from the first thick-film portion, the first thin-film portion, and the first level difference of the patterned insulating layer, respectively; etching the first III-V group compound semiconductor layer using the first insulating layer mask to a middle of a thickness direction of the first III-V group compound semiconductor layer; forming a second insulating layer mask having a shape of the second thick-film portion of the first insulating layer mask by etching an entire surface of the first insulating layer mask until the second thin-film portion of the first insulating layer mask is completely removed; and forming the first core layer and a first semiconductor mesa including the cladding layer by etching a remainder of the first III-V group compound semiconductor layer and the first semiconductor layer using the second insulating layer mask. The patterned insulating layer has a pair of first edges extending along a first axis, the pair of first edges of the patterned insulating layer being spaced apart from each other by a first width. The first insulating layer mask has a pair of second edges extending along the first axis, the pair of second edges of the first insulating layer mask being spaced apart from each other by a second width smaller than the first width. In addition, the second width defines widths of the first core layer and the first semiconductor mesa.

In the method for manufacturing a semiconductor optical waveguide device, the level difference having a shape corresponding to the shape of the first mask is formed by etching the insulating layer, and the patterned insulating layer including the thick-film portion and the thin-film portion is formed.

The patterned insulating layer including the level difference can be further processed to form the first insulating layer mask, which defines the shape of the second semiconductor mesa. The stacked semiconductor layer is etched using the first insulating layer mask to form a mesa structure.

After the etching of the stacked semiconductor layer using the first insulating layer mask, the second insulating layer mask that defines the shape of the first semiconductor mesa is formed utilizing the difference in film thickness in the first insulating layer mask.

The method for manufacturing a semiconductor optical waveguide device may further include a step of, after forming the first core layer and the first semiconductor mesa, forming a second semiconductor mesa by etching a remainder of the first III-V group compound semiconductor layer on the first core layer and the second III-V group compound semiconductor layer. The second semiconductor mesa may include the intermediate layer and the first core layer. The intermediate layer may have substantially the same width as the first core layer.

The method for manufacturing a semiconductor optical waveguide device may further include the steps of, after forming the first core layer and the first semiconductor mesa, forming a second insulating layer on a side surface of the first semiconductor mesa and on the second insulating layer mask and the substrate, the second insulating layer covering the second insulating layer mask on a surface of the first semiconductor mesa; forming a third insulating layer mask by etching the second insulating layer without a mask, the third insulating layer mask having a pattern in which the second insulating layer mask, a surface of a remainder of the first III-V group compound semiconductor layer on the first core layer and a surface of the second III-V group compound semiconductor layer on the second semiconductor layer are exposed through the third insulating layer mask; forming a second semiconductor mesa by wet-etching a remainder of the first III-V group compound semiconductor layer on the first core layer and the second III-V group compound semiconductor layer on the second semiconductor layer using the third insulating layer mask, the second semiconductor mesa including the intermediate layer and the first core layer; and removing the third insulating layer mask.

In this method for manufacturing a semiconductor optical waveguide device, the remainder of the first III-V group compound semiconductor layer and the second III-V group compound semiconductor layer are selectively removed by wet etching using the insulating layer mask.

The method for manufacturing a semiconductor optical waveguide device may further include the steps of, after the step of forming the second semiconductor mesa, forming a fourth insulating layer mask having a pattern that defines a third semiconductor mesa; and forming the third semiconductor mesa including the second core layer by etching the second semiconductor layer using the fourth insulating layer mask.

In this method for manufacturing a semiconductor optical waveguide device, the formation of the second semiconductor mesa is followed by the formation of the third semiconductor mesa. Thus, the spot size converter can be realized as a result of vertical optical propagation.

The method for manufacturing a semiconductor optical waveguide device may further include a step of forming a first electrode on a surface of the third semiconductor mesa and forming a second electrode on a surface of the first semiconductor mesa. In this method, light propagating through the first core layer can be processed using the first electrode and the second electrode, in the method for manufacturing a semiconductor optical waveguide device, the substrate may be made of InP. The second III-V group compound semiconductor layer may be made of n-type InP. In addition, the first III-V group compound semiconductor layer may be made of p-type InP.

BRIEF DESCRIPTION OF THE DRAWINGS

FIGS. 6A to 6D are schematic views of steps of a method for manufacturing a semiconductor optical waveguide device according to an embodiment of the present invention.

FIGS. 8A to 8D are schematic views of steps of a method for manufacturing a semiconductor optical waveguide device according to an embodiment of the present invention.

FIGS. 11A, 11B, and 11C are schematic views of steps of a method for manufacturing a semiconductor optical waveguide device according to an embodiment of the present invention.

FIGS. 13A, 13B, and 13C are schematic views of steps of a method for manufacturing a semiconductor optical waveguide device according to an embodiment of the present invention.

FIGS. 16A, 16B, and 16C are schematic views of steps of a method for manufacturing a semiconductor optical waveguide device according to an embodiment of the present invention.

FIGS. 25A, 25B, and 25C are schematic views of steps of a method for manufacturing a semiconductor optical waveguide device according to an embodiment of the present invention.

FIGS. 26A, 26B, and 26C are schematic views of steps of a method for manufacturing a semiconductor optical waveguide device according to an embodiment of the present invention.

FIGS. 27A, 27B, and 27C are schematic views of steps of a method for manufacturing a semiconductor optical waveguide device according to an embodiment of the present invention.

FIGS. 28A, 28B, and 28C are schematic views of steps of a method for manufacturing a semiconductor optical waveguide device according to an embodiment of the present invention.

FIGS. 34A and 34B are schematic views of a semiconductor optical waveguide device according to an embodiment of the present invention.

FIGS. 35A, 35B, and 35C are schematic views of steps of a method for manufacturing a semiconductor optical waveguide device according to an embodiment of the present invention.

DESCRIPTION OF THE PREFERRED EMBODIMENTS

Figure 1:
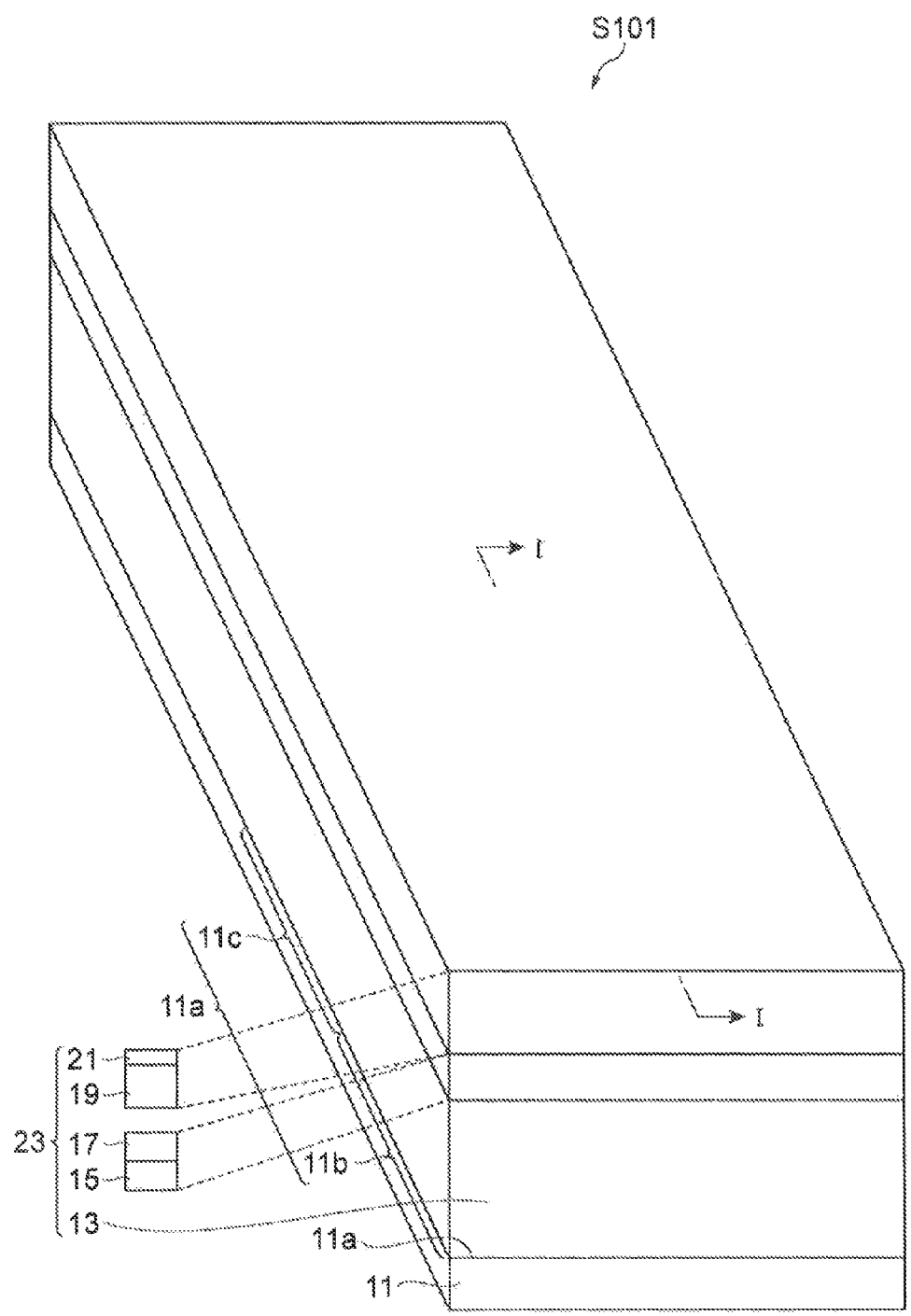
FIG. 1 is a schematic view of step S101 of a method for manufacturing a semiconductor optical waveguide device according to an embodiment of the present invention.

The present invention will be better understood from the following detailed description with reference to the accompanying drawings. A semiconductor optical waveguide device and a method for manufacturing the semiconductor optical waveguide device according to an embodiment of the present invention will be described below with reference to the accompanying drawings. Like reference numerals designate like parts throughout these figures.

FIGS. 1 to 33C are schematic views of steps of a method for manufacturing a semiconductor optical waveguide device including a spot size converter according to an embodiment of the present invention. In step S101, as illustrated in FIG. 1, a substrate 11 on which a stacked semiconductor layer is grown is prepared. The substrate 11 is formed of a III-V group compound semiconductor and has a principal surface 11a. A second semiconductor layer 13 serving as a second core layer, a second III-V group compound semiconductor layer 15 serving as an intermediate layer, a first semiconductor layer 17 serving as a first core layer, a first III-V group compound semiconductor layer 19 serving as a cladding layer, and a third III-V group compound semiconductor layer 21 serving as a contact layer are grown on the principal surface 11a of the substrate 11. These layers are formed using a metal-organic vapor phase epitaxy (MOVPE) method, for example. The semiconductor layers 13, 15, 17, 19, and 21 constitute a stacked semiconductor layer 23. The principal surface 11a of the semiconductor substrate 11 includes a first area 11b and a second area 11c. A spot size converter is provided in the first area 11b. A semiconductor optical device for processing light from or to the spot size converter is provided in the second area 11c. In the embodiment, the semiconductor optical device is an optical modulator, for example.

Figure 2A:
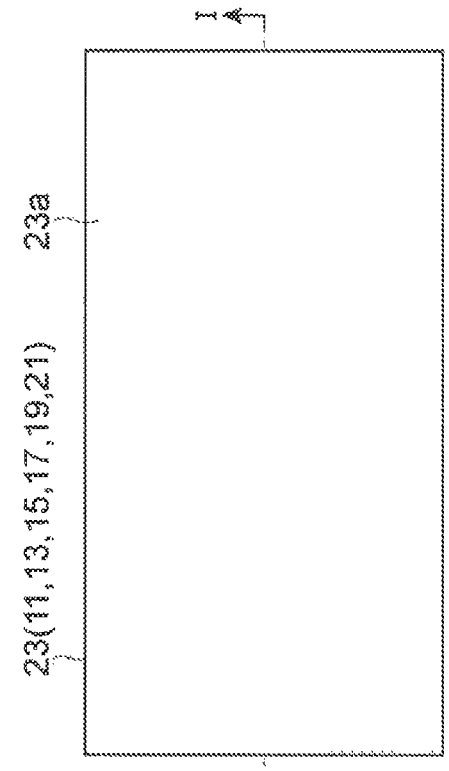
FIGS. 2A and 2B are schematic views of steps of a method for manufacturing a semiconductor optical waveguide device according to an embodiment of the present invention.
Figure 2B:
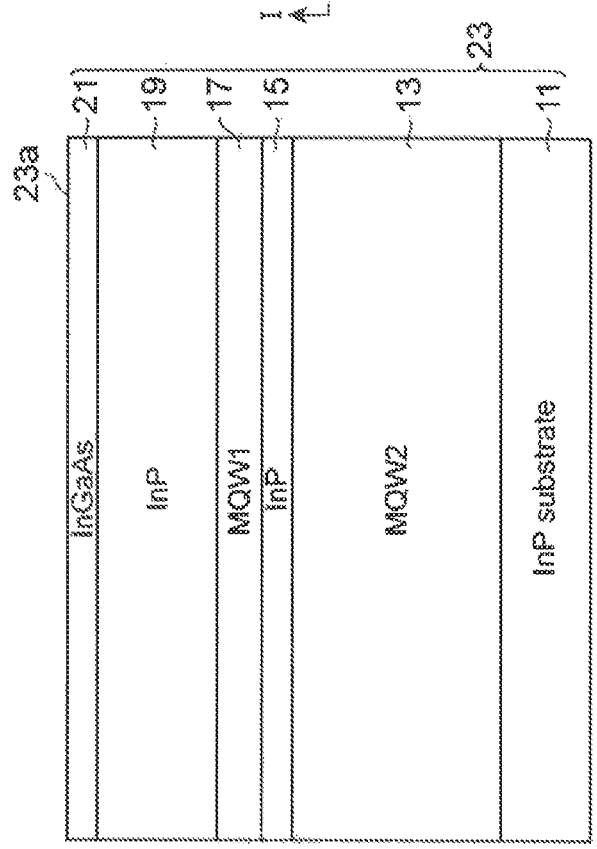

FIG. 2A is a cross-sectional view taken along the line I-I in FIG. 1. FIG. 2B is a plan view of FIG. 1. In one embodiment, the following epitaxial layers are grown. An InP cladding layer (thickness: 0.1 μm) is grown as a buffer on an InP wafer. A first core layer is then grown on the InP buffer layer. The first core layer has a multi-quantum well (MQW) structure (MQW thickness: 5 μm) in which an n-InP layer (thickness: 50 nm) and an n-InGaAsF layer (thickness: 50 nm, photoluminescence (PL) peak wavelength: 1.1 μm) are alternately stacked. The top layer of the first core layer includes a semiconductor layer formed of a material different from the material of an intermediate layer grown in a downstream step (in the present embodiment, InGaAsP, which is different from InP). An n-InP intermediate layer (thickness: 200 nm) is grown on the top layer of the first core layer. A second core layer is then grown on the InP intermediate layer. This second core layer has a multi-quantum well (MQW) structure (MQW thickness: 500 nm) in which an AlInAs layer (thickness: 5 nm) and an AlGaInAs layer (thickness: 10 nm) are alternately stacked. The top layer of the second core layer preferably includes a semiconductor layer formed of a material different from the material of a cladding layer grown in a downstream step (in the present embodiment, AlInAs, which is different from InP). A p-InP cladding layer (thickness: 1.25 µm) and a p-GaInAs contact layer (thickness: 150 nm) are grown on the second core layer.

Figure 3:
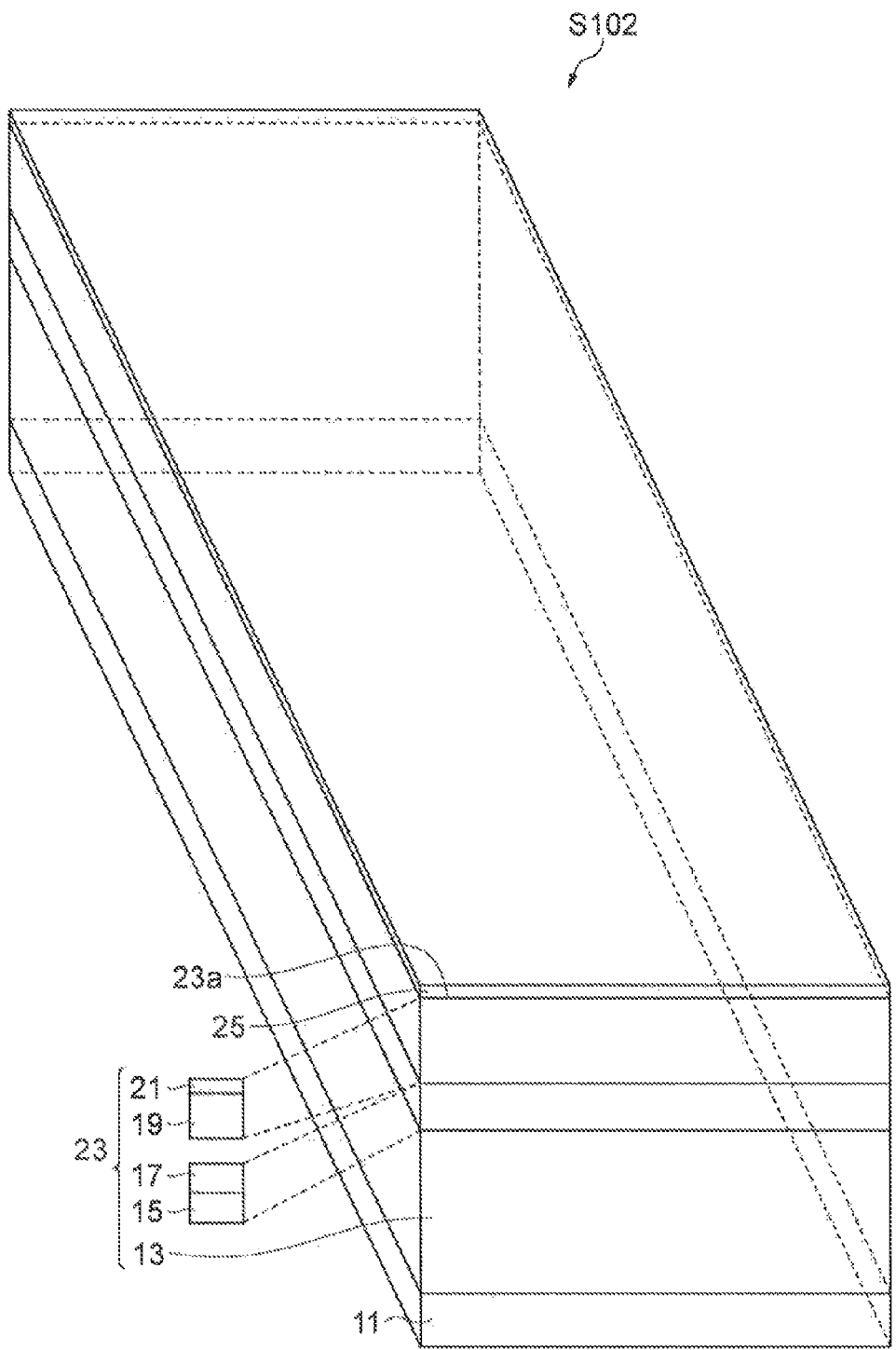
FIG. 3 is a schematic view of step S102 of a method for manufacturing a semiconductor optical waveguide device according to an embodiment of the present invention.
Figure 4B:
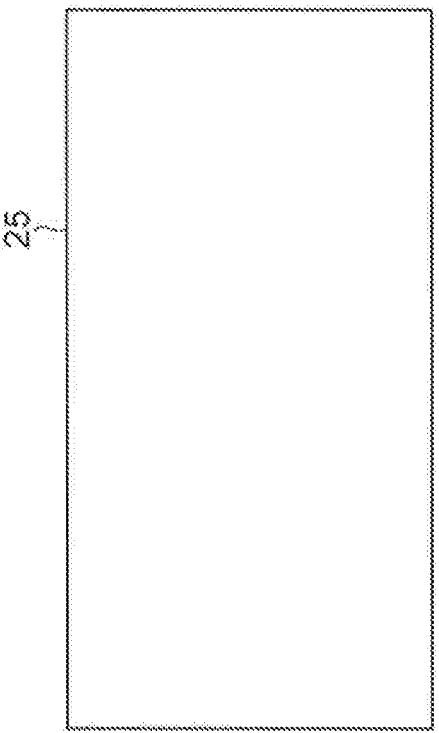
FIGS. 4A and 4B are schematic views of steps of a method for manufacturing a semiconductor optical waveguide device according to an embodiment of the present invention.
Figure 4A:
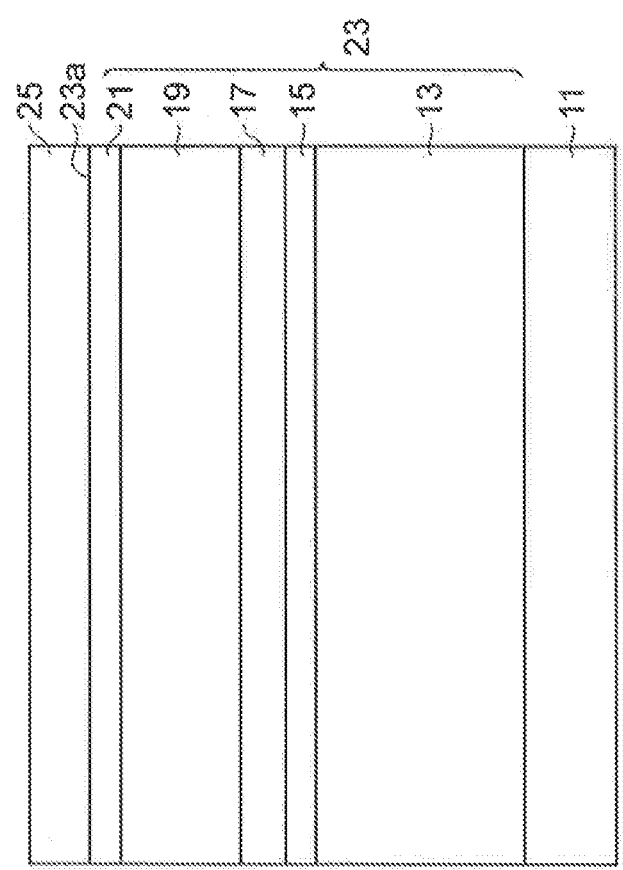

As illustrated in FIG. 3, in step S102, an insulating layer 25 is formed on a surface 23a of the stacked semiconductor layer 23. The insulating layer 25 is a first insulating layer in the embodiment. The insulating layer 25 is made of, for example, silicon nitride (SiN) or silicon dioxide ($SiO_2$). The insulating layer 25 has a thickness in the range of 400 to 600 nm. The insulating layer 25 has a greater thickness than an insulating layer used as an etching mask for etching a semiconductor layer. A SiN film serving as the insulating layer 25 is formed using a chemical vapor deposition (CVD) method, for example. In the present embodiment, as illustrated in FIGS. 4A and 4B, a SiN film having a thickness of 500 nm is used as the insulating layer 25. This thickness is approximately twice the thickness of a SiN film used as an etching mask for etching a semiconductor layer.

Figure 5:
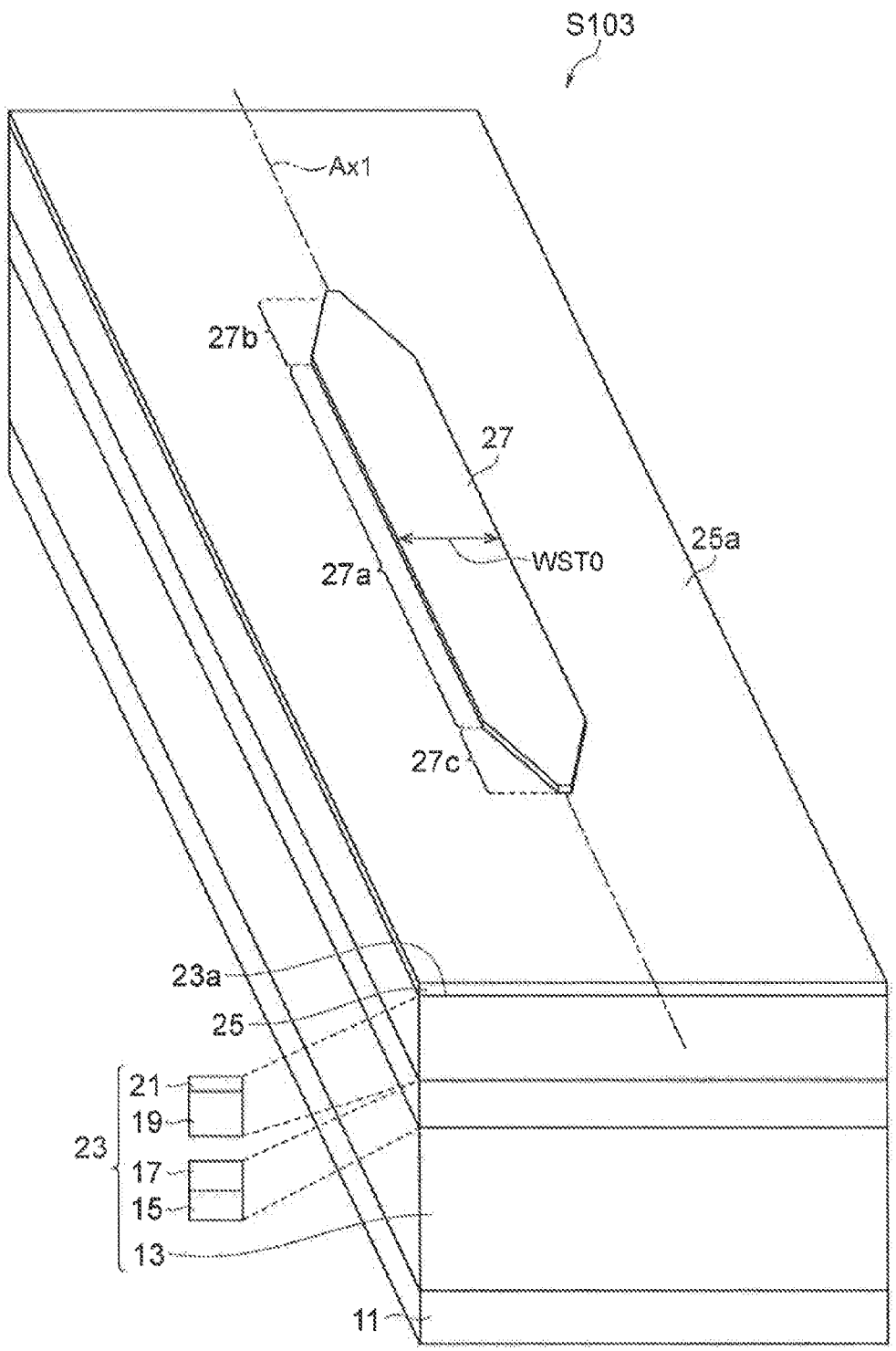
FIG. 5 is a schematic view of step S103 of a method for manufacturing a semiconductor optical waveguide device according to an embodiment of the present invention.

In step S103, as illustrated in FIG. 5, a first mask 27 for a first semiconductor mesa is formed on the insulating layer 25. The first mask 27 includes a stripe portion 27a extending along a first axis Ax1, a tapered portion 27b at one end of the stripe portion 27a, and a tapered portion 27c at the other end of the stripe portion 27a. The width WST0 of the stripe portion 27a is greater than the width of the first semiconductor mesa. The shapes of the tapered portions 27b and 27c define the shapes of terminal portions of the first semiconductor mesa. In the present embodiment, the first mask 27 is a resist mask. The resist mask is formed using the following procedure, for example. As illustrated in FIGS. 6A and 6B, a resist is applied on the insulating layer 25. A photomask or reticle having a pattern that defines the first mask 27 is prepared. As illustrated in FIGS. 6C and 6D, the pattern of the photomask or reticle is transferred to the resist through exposure and development using a photolithography method to form a resist mask.

Figure 7:
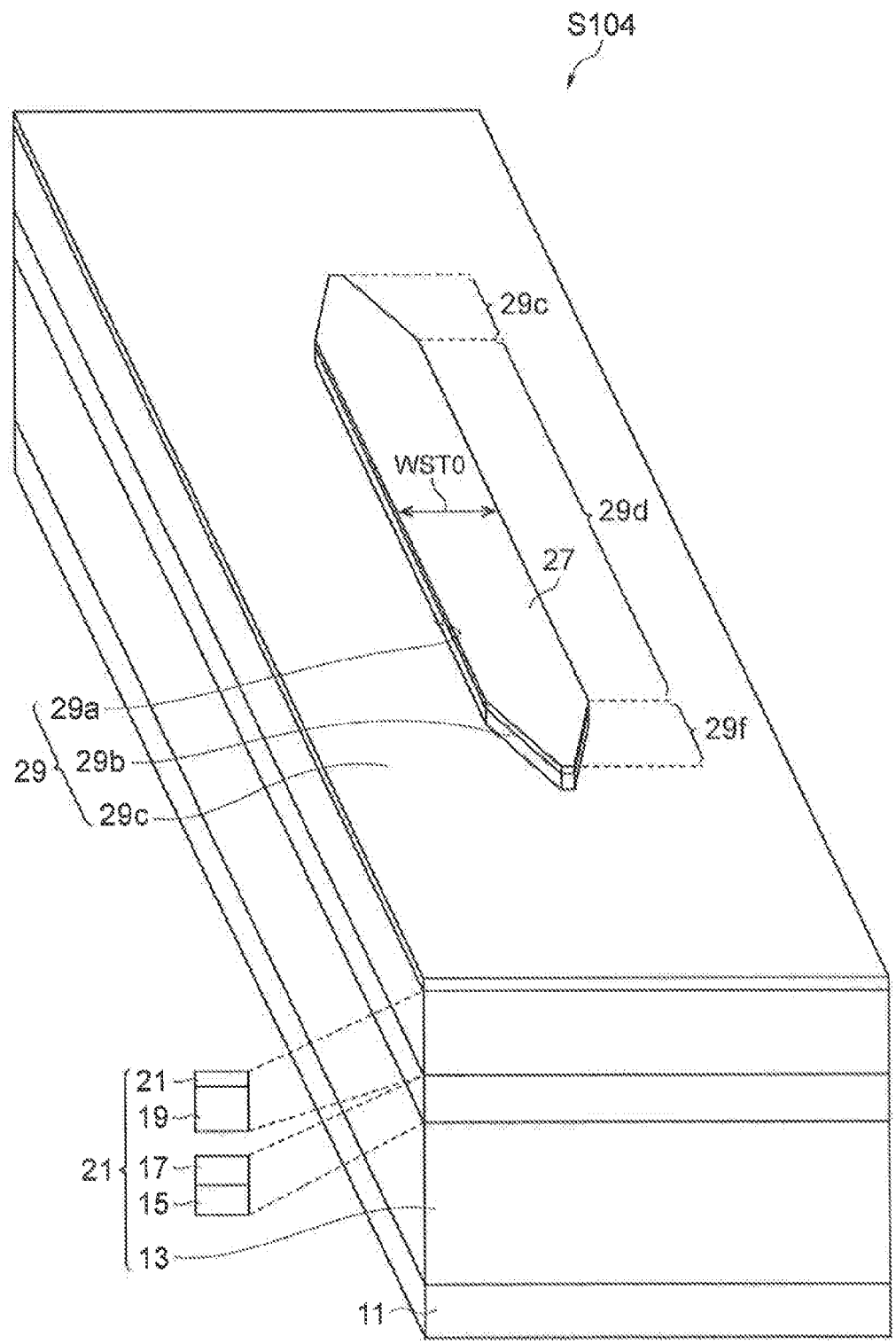
FIG. 7 is a schematic view of step S104 of a method for manufacturing a semiconductor optical waveguide device according to an embodiment of the present invention.

In step S104, as illustrated in FIG. 7, the insulating layer 25 is etched using the first mask 27 to form a patterned insulating layer 29. The patterned insulating layer 29 has a level difference 29a, a thick-film portion 29b, and a thin-film portion 29c. The patterned insulating layer 29 has a shape corresponding to the shape of the first mask 27. In the embodiment, the level difference 29a, the thick-film portion 29b and the thin-film portion 29c are a first level difference, a first thick-film portion and a first thin-film portion, respectively. The level difference 29a separates the thick-film portion 29b from the thin-film portion 29c. In consideration of the subsequent process, the thin-film portion 29c has a thickness in the range of 200 to 300 nm, in the present embodiment, the insulating layer 25 is a SiN film having a thickness of 500 nm. As illustrated in FIGS. 8A and 8B, the thick-film portion 29b has a thickness of 500 nm. The thin-film portion 29c has a thickness of 250 nm, in FIG. 8B, the thick-film portion 29b includes a stripe portion 29d extending along the first axis Ax1, a tapered portion 29e at one end of the stripe portion 29d, and a tapered portion 29f at the other end of the stripe portion 29d. The width WST0 of the stripe portion 29d is greater than the width of the first semiconductor mesa. The shapes of the tapered portions 29e and 29f define the shapes of terminal portions of the first semiconductor mesa. The broken line in FIG. 8B indicates the width WST1 of a stripe portion of the first semiconductor mesa. As illustrated in FIGS. 8C and 8D, the surface of the thick-film portion 29b is exposed by removing the resist mask 27. The width WST0 is greater than the width WST1, for example, by approximately 1 to 2 µm. The SiN film is etched by dry etching using $CF_4$ gas, for example. The SiN film is etched to half the thickness thereof, that is, approximately 250 nm. After the etching, the resist is removed.

Figure 9:
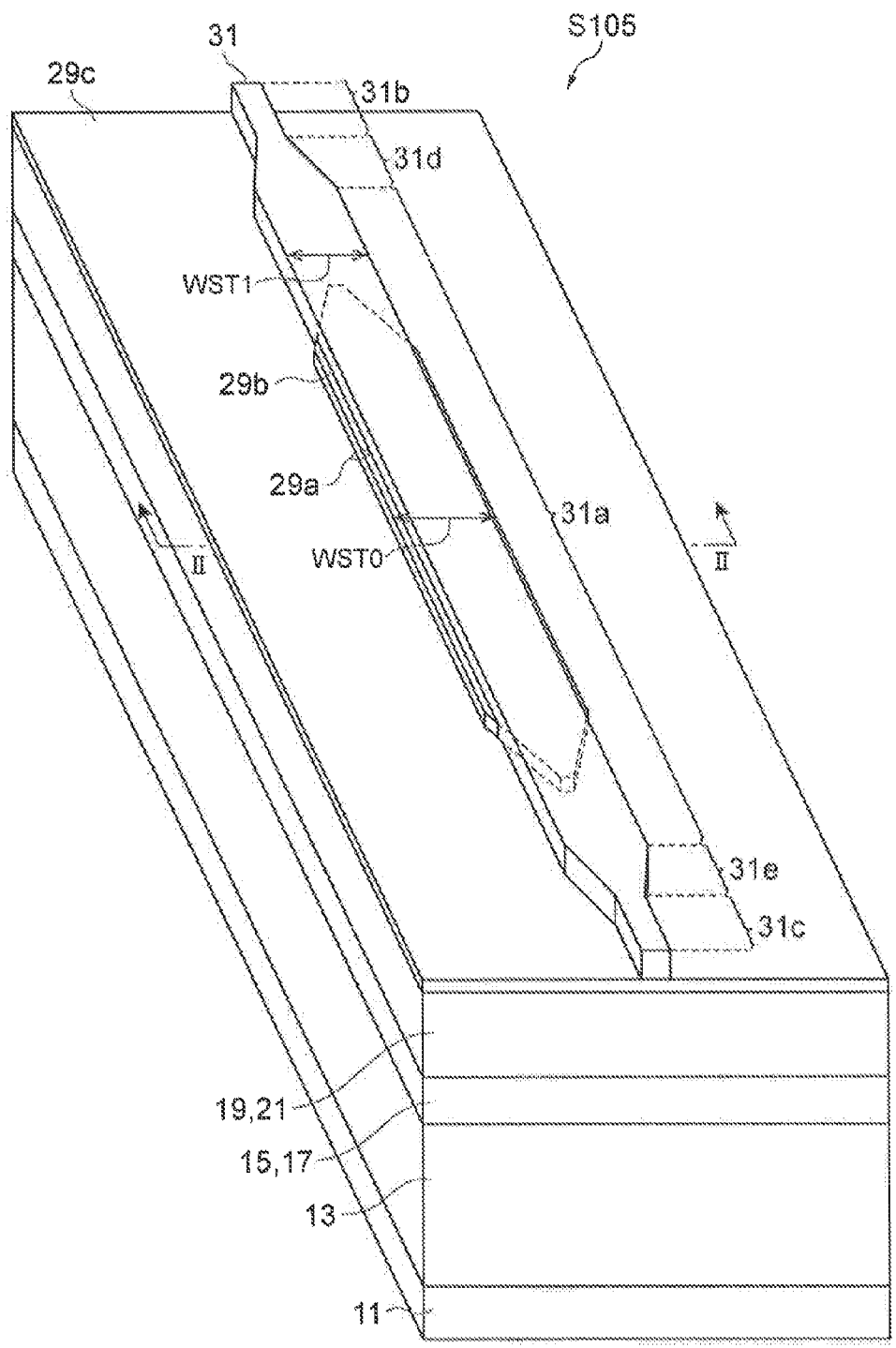
FIG. 9 is a schematic view of step S105 of a method for manufacturing a semiconductor optical waveguide device according to an embodiment of the present invention.

After the level difference 29a is formed in the insulating layer 25, a second mask 31 that defines a second semiconductor mesa is formed on the patterned insulating layer 29 in step S105, as illustrated in FIG. 9. The second mask 31 defines the widths of the first semiconductor mesa and the second semiconductor mesa. The second mask 31 includes a stripe portion 31a, terminal stripe portions 31b and 31c, a tapered portion 31d, and a tapered portion 31e. The stripe portion 31a is used for forming an optical waveguide having a certain width. The terminal stripe portions 31b and 31c have a smaller width than the stripe portion 31a. The tapered portion 31d connects the stripe portion 31a to the terminal stripe portion 31b. The tapered portion 31e connects the stripe portion 31a to the terminal stripe portion 31c. The stripe portion 31a is provided with the terminal stripe portion 31b at one end thereof. The stripe portion 31a is provided with the terminal stripe portion 31c at the other end thereof. The tapered portion 31d is disposed between the stripe portion 31a and the terminal stripe portion 31b. The tapered portion 31e is disposed between the stripe portion 31a and the terminal stripe portion 31c. The terminal stripe portions 31b and 31c have a narrow stripe shape for terminating the second semiconductor mesa.

Figure 10A:
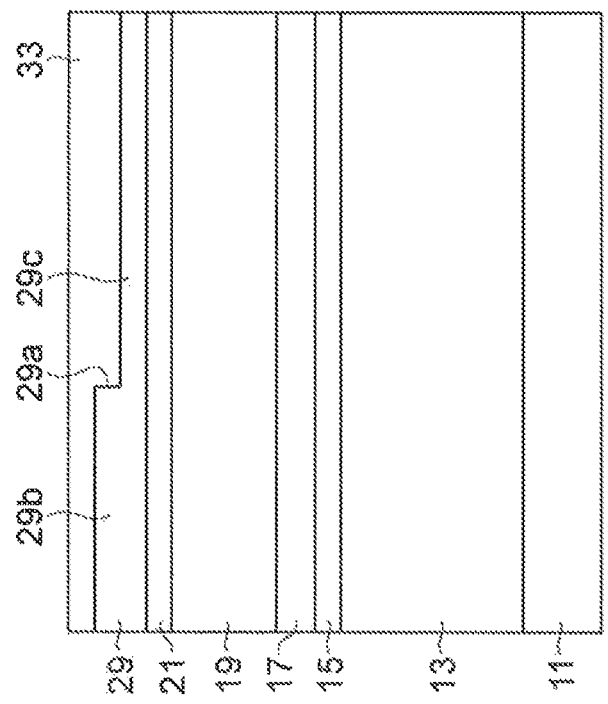
FIGS. 10A and 10B are schematic views of steps of a method for manufacturing a semiconductor optical waveguide device according to an embodiment of the present invention.
Figure 10B:
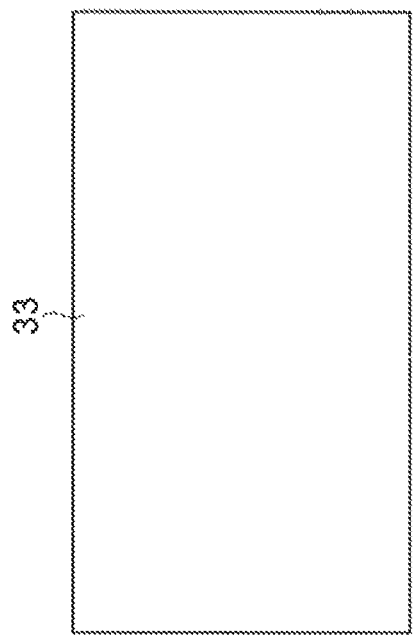

In the present embodiment, the second mask 31 is a resist mask. The resist mask is formed using the following procedure, for example. As illustrated in FIGS. 10A and 10B, a resist is applied on the patterned insulating layer 29. A photomask or reticle having a pattern that defines the second mask 31 is prepared. As illustrated in FIGS. 11A, 11B, and 11C, the pattern of the photomask or reticle is transferred to the resist through exposure and development using a photolithography method to form a resist mask (the second mask 31). More specifically, after a resist is applied, the resist is patterned (FIG. 11C, which is a cross-sectional view taken along the line II-II in FIG. 11B). The resist pattern is formed on the level difference in the SiN film. As compared with patterning of a resist covering a semiconductor mesa having a height of more than 1 µm, a height of the level difference in the underlayer mask is reduced to be approximately 250 nm, for example. Thus, the thickness of the resist is smaller than the thickness of a resist applied on a semiconductor mesa having a height of more than 1 µm. Use of a thick resist makes it difficult to control the width of a terminal stripe of the second semiconductor mesa. In this embodiment, the width of a terminal stripe of the second semiconductor mesa is controlled with high precision by reducing the thickness of the resist. Since a pattern is formed on a thin resist, fine patterning is performed during the formation of a waveguide terminal. Furthermore, the wafer in-plane distribution (variations) of the width of a narrow portion is reduced in the fine patterning. The stripe portion (linear portion) of the first semiconductor mesa is also processed to a desired width.

As illustrated in FIGS. 11A to 11C, the width WST0 of the thick-film portion 29b is greater than the width WST1 of the stripe portion 31a. Thus, the thick-film portion 29b includes a protrusion not covered with the stripe portion 31a at both sides of the stripe portion 31a of the second mask 31.

Figure 12:
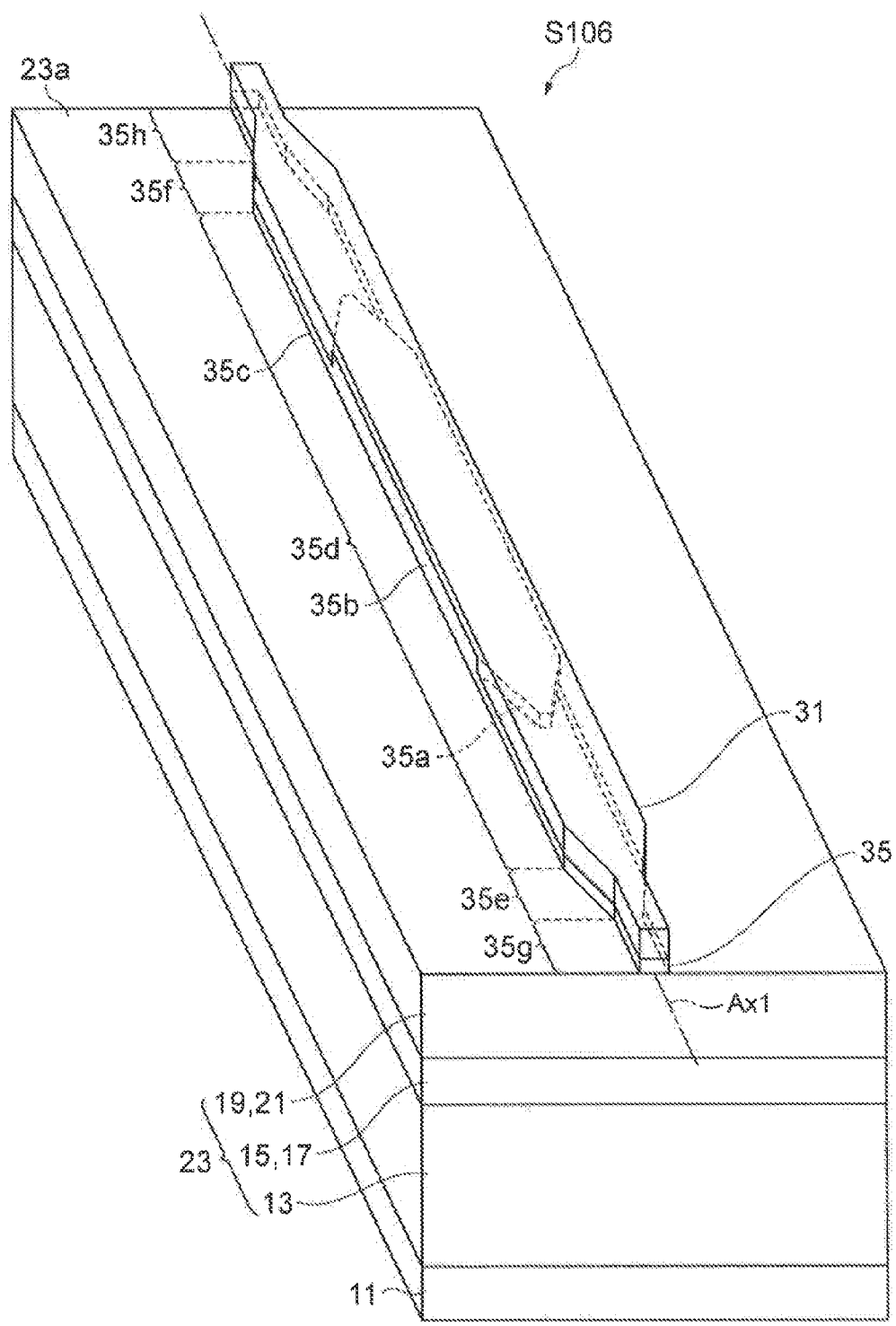
FIG. 12 is a schematic view of step S106 of a method for manufacturing a semiconductor optical waveguide device according to an embodiment of the present invention.

In step S106, as illustrated in FIG. 12, the patterned insulating layer 29 is etched using the second mask 31 to form a first insulating layer mask 35. The first insulating layer mask 35 has a shape corresponding to the shape of the second mask 31 and includes a level difference 35a, a thick-film portion 35b, and a thin-film portion 35c that are formed from the first level difference 29a, the thick-film portion 29b, and the thin-film portion 29c, respectively. In the embodiment, the level difference 35a, the thick-film portion 35b, and the thin-film portion 35c are a second level difference, a second thick-film portion, and a second thin-film portion, respectively. The level difference 35a separates the thick-film portion 35b from the thin-film portion 35c. The level difference 35a defines the shape of a tapered portion of the first semiconductor mesa. In FIG. 12, the first insulating layer mask 35 includes a stripe portion 35d extending along the first axis Ax1, a tapered portion 35e at one end of the stripe portion 35d, and a tapered portion 35f at the other end of the stripe portion 35d. The stripe portion 35d is configured to form an optical waveguide having a certain width. The first insulating layer mask 35 includes terminal stripe portions 35g and 35h connected to the tapered portions 35e and 35f, respectively. The terminal stripe portions 35g and 35h have a smaller width than the stripe portion 35d. The terminal stripe portions 35g and 35h have a width in the range of approximately 0.3 to 0.6 μm, for example. The width WST1 of the stripe portion 35d is substantially the same as the widths of the first semiconductor mesa and the second semiconductor mesa. The shapes of the tapered portions 35e and 35f define the shapes of tapered terminal portions of the first semiconductor mesa. The broken line in FIG. 11B indicates the width WST1 of a stripe portion of the second semiconductor mesa. After the etching, the second mask 31 is removed. The thick-film portion 35b and the thin-film portion 35c are exposed by removing the resist mask 31. The patterned insulating layer 29 has a pair of first edges extending along the first axis Ax1. The pair of first edges of the patterned insulating layer 29 are spaced apart from each other by a first width WST0. A pair of second edges of the first insulating layer mask 35 are spaced apart from each other by a second width WST1. The second width WST1 is smaller than the first width WST0 and defines the width of the first core layer and the width of the first semiconductor mesa.

More specifically, the thick-film portion 29b of the patterned insulating layer 29 has a width measured on the second area 11c (which corresponds to the first maximum width WST0 of the thick-film portion 29b). The first insulating layer mask 35 has a smaller width than the thick-film portion 29b on the second area 11c (which corresponds to the second maximum width WST1). The width WST1 defines the width of the first core layer and the width of the first semiconductor mesa. The width WST1 is set to a width for a single-mode waveguide. These layers are formed in a downstream step.

Figure 14B:
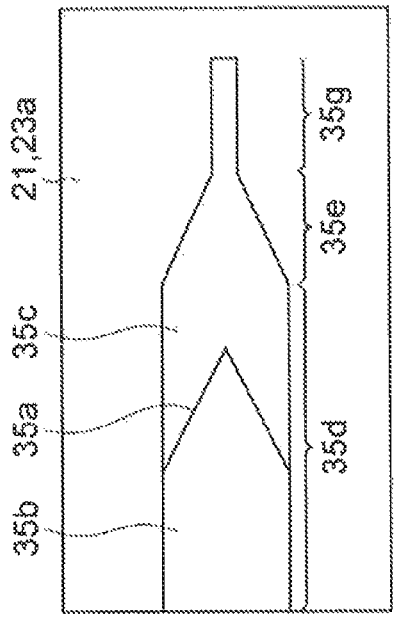
FIGS. 14A, 14B, and 14C are schematic views of steps of a method for manufacturing a semiconductor optical waveguide device according to an embodiment of the present invention.
Figure 14C:
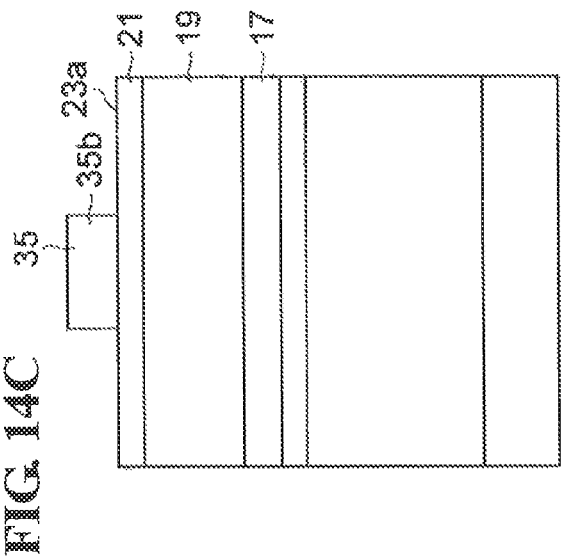
Figure 14A:
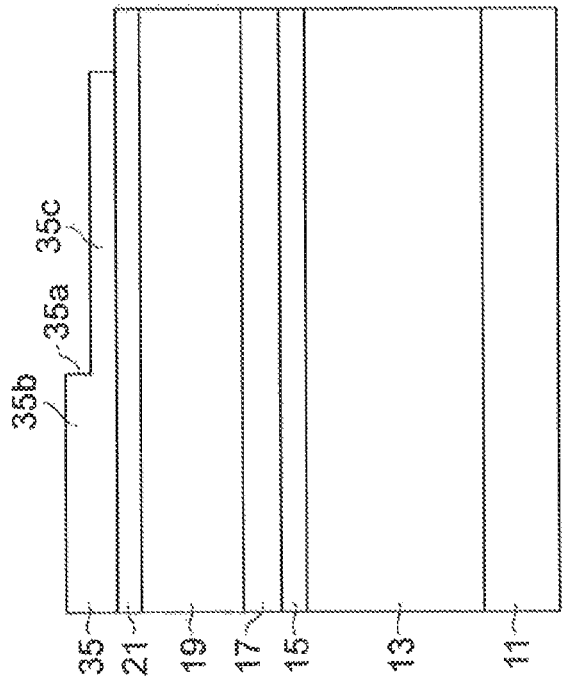

In the present embodiment, as illustrated in FIGS. 13A, 13B, and 13C, the SiN film is dry-etched using the resist mask (the second mask 31) and $CF_4$ gas to expose the GaInAs contact layer. This process involves the etching of the thin-film portion (having a thickness of 250 nm) and the thick-film portion (having a thickness of 500 nm) of the SiN film. The etching time is determined such that the film having a thickness of 500 nm is completely removed. Although the thin-film portion is overetched, only the SiN film is selectively dry-etched using $CF_4$ gas, and the semiconductor layer (the p-GaInAs contact layer) under the SiN film is hardly etched in the dry etching process using $CF_4$, gas. After the etching of the SiN film, the resist of the second mask 31 is removed, as illustrated in FIGS. 14A, 14B, and 14C.

Figure 15:
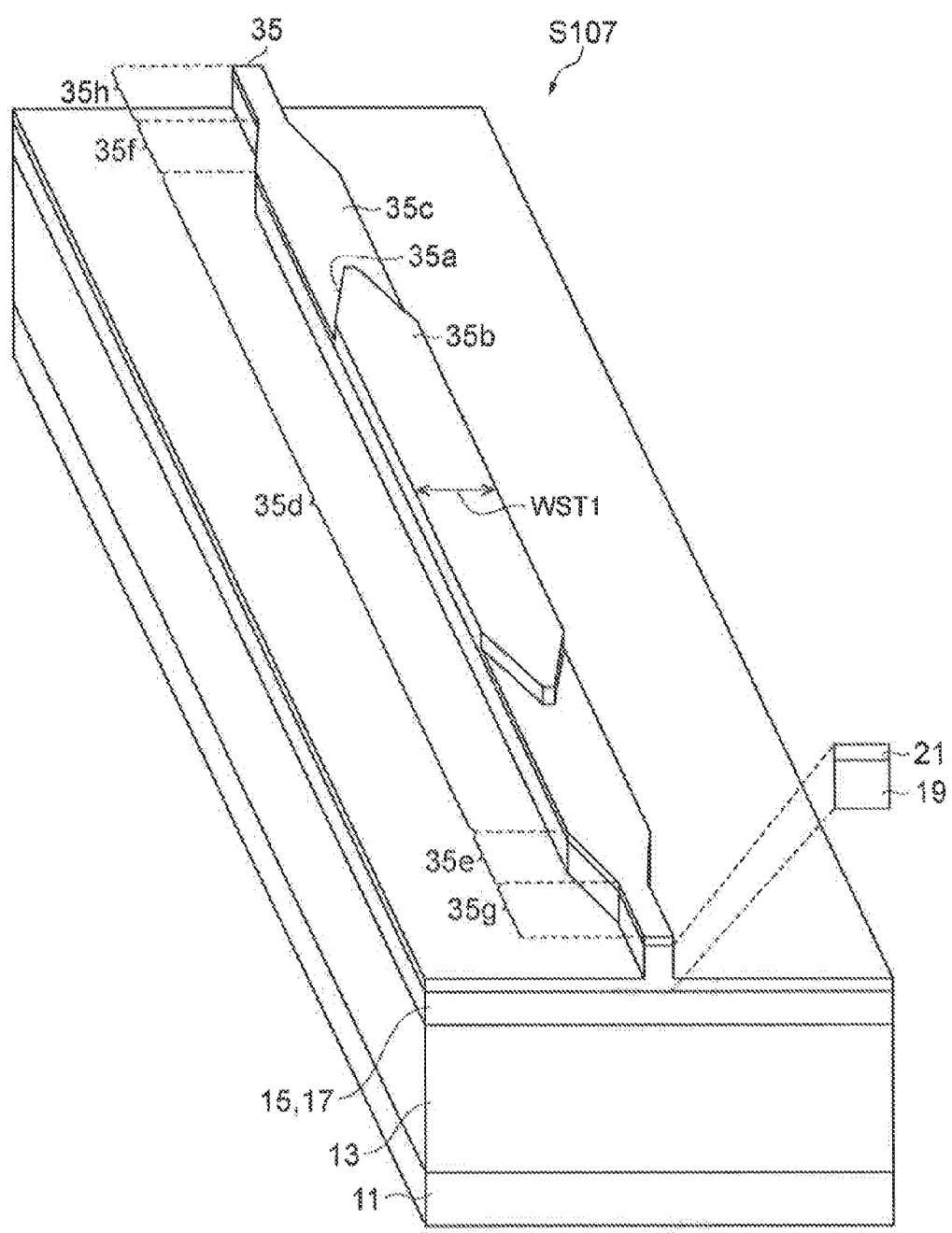
FIG. 15 is a schematic view of step S107 of a method for manufacturing a semiconductor optical waveguide device according to an embodiment of the present invention.

In step S107, as illustrated in FIG. 15, after the second mask 31 is removed, the third III-V group compound semiconductor layer 21 and part of the first III-V group compound semiconductor layer 19 are etched using the first insulating layer mask 35. After the etching, the remainder of the first III-V group compound semiconductor layer 19 is disposed on the surface of the first semiconductor layer 17 serving as the first core layer. In the present embodiment, as illustrated in FIGS. 16A, 16B, and 16C, the GaInAs contact layer and the InP cladding layer are etched to a depth of 750 nm using the SiN mask (the first insulating layer mask 35) having the shape of the second semiconductor mesa.

Figure 17:
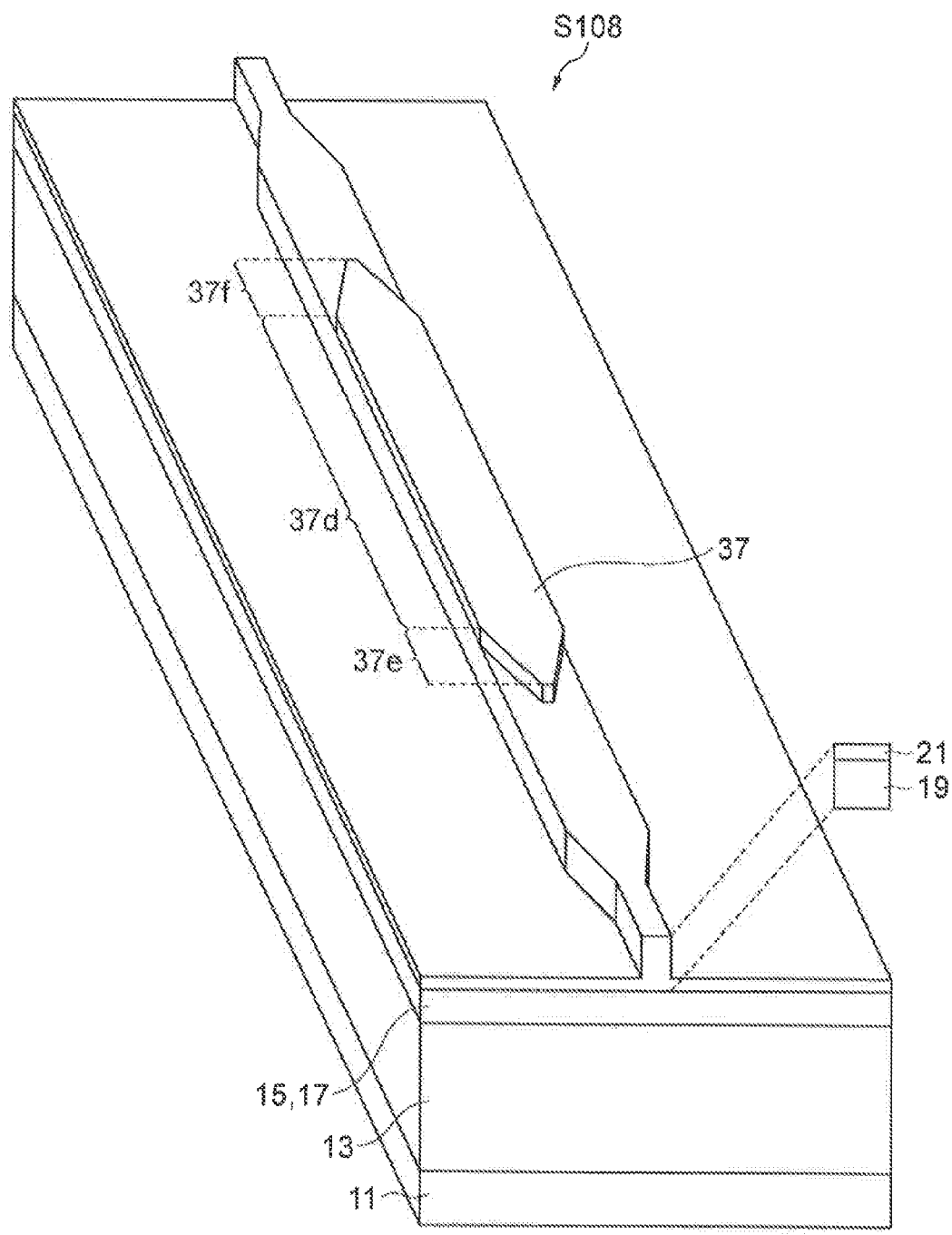
FIG. 17 is a schematic view of step S108 of a method for manufacturing a semiconductor optical waveguide device according to an embodiment of the present invention.
Figure 18B:
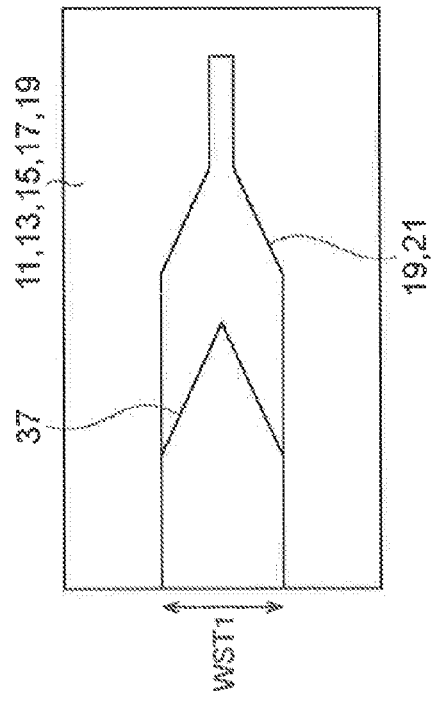
FIGS. 18A, 18B, and 18C are schematic views of steps of a method for manufacturing a semiconductor optical waveguide device according to an embodiment of the present invention.
Figure 18C:
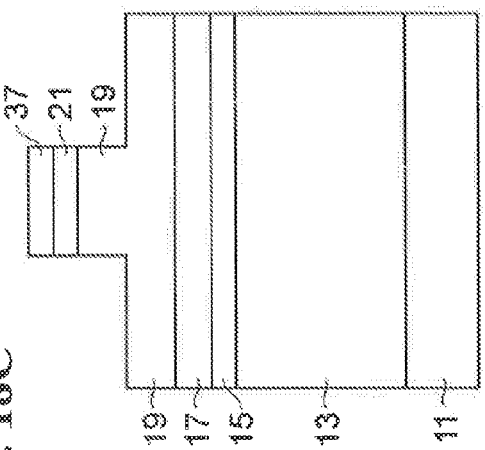
Figure 18A:
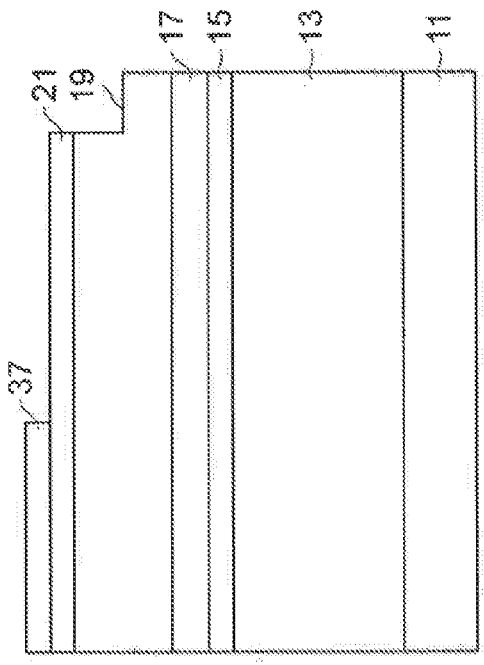

In step S108, after the III-V group compound semiconductor layers 21 and 19 serving as the contact layer and the cladding layer, respectively, are etched, the entire surface of the first insulating layer mask 35 is etched to form a second insulating layer mask 37, as illustrated in FIG. 17. This etching completely removes the thin-film portion 35c of the first insulating layer mask 35. The second insulating layer mask 37 defines the shape of the first semiconductor mesa and has the shape of the thick-film portion 35b. The second insulating layer mask 37 includes a stripe portion 37d extending along the first axis Ax1, a tapered portion 37e at one end of the stripe portion 37d, and a tapered portion 37f at the other end of the stripe portion 37d. The stripe portion 37d is configured to form an optical waveguide having a certain width. The width WST1 of the stripe portion 37d is the same as the width of the first semiconductor mesa. The shapes of the tapered portions 37e and 37f define the shapes of terminal portions of the first semiconductor mesa. The width WST1 in FIGS. 18A, 18B, and 18C represents the width of the waveguide stripe of the first semiconductor mesa. By removing the thin-film portion, the top surface of the semiconductor mesa including the III-V group compound semiconductor layers 21 and 19 is exposed through the second insulating layer mask 37. The level difference 35a defines the shape of the second insulating layer mask 37. When the first insulating layer mask 35 is made of a SiN film, the entire surface of the first insulating layer mask 35 is etched by dry etching using $CF_4$ gas.

In the present embodiment, the entire surface of the first insulating layer mask 35 is etched such that the SiN film having a thickness of 250 nm is completely etched using $CF_4$ gas. This etching completely removes the thin-film portion 35c defining the shape of the second semiconductor mesa from the insulating layer mask 35. However, a SiN film mask reflecting the shape of the thick-film portion 35b is left. The SiN film is selectively etched using $CF_4$ gas plasma. Thus, the exposed InP cladding layer is hardly etched using the $CF_4$ gas plasma.

Figure 19:
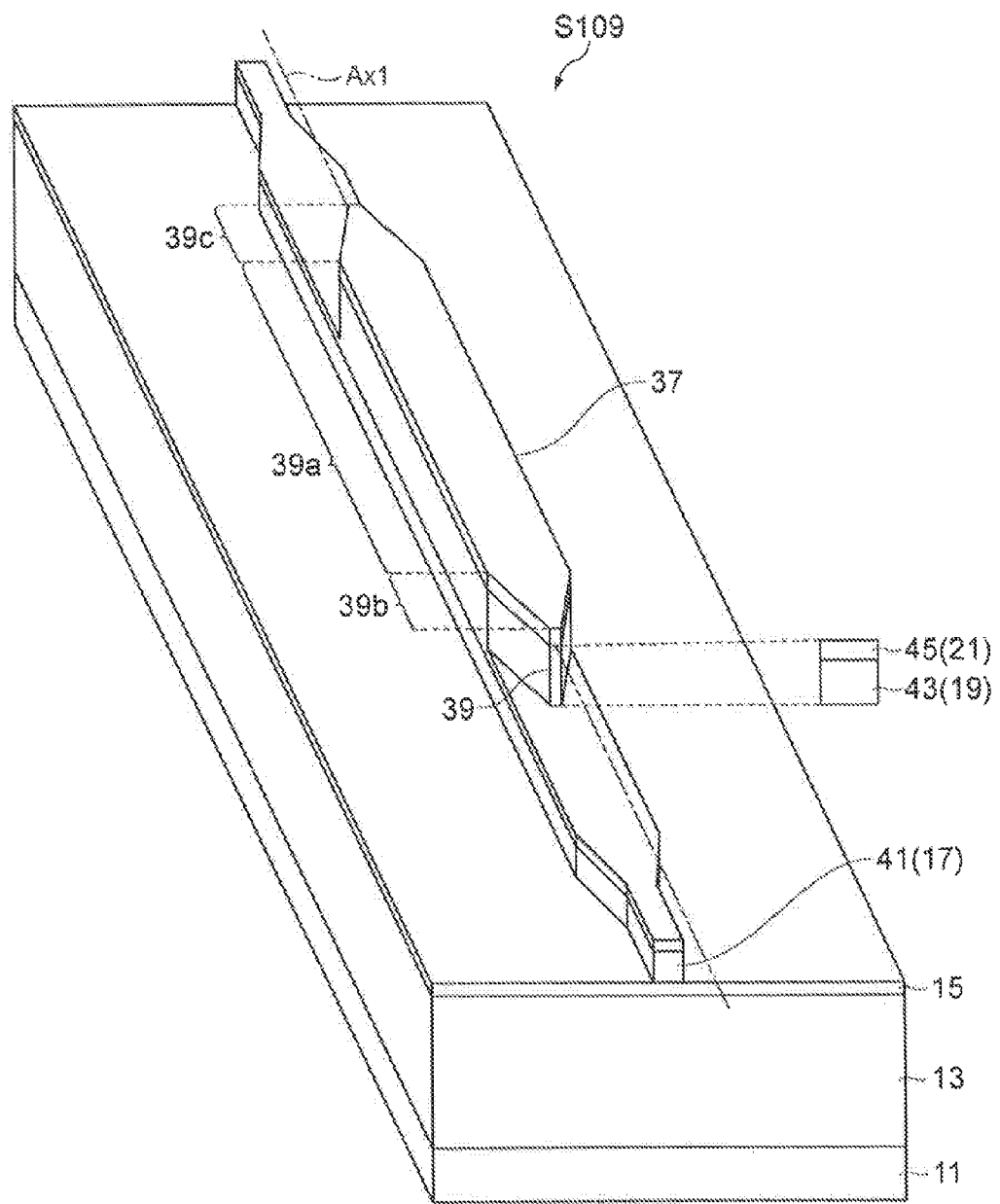
FIG. 19 is a schematic view of step S109 of a method for manufacturing a semiconductor optical waveguide device according to an embodiment of the present invention.

In step S109, as illustrated in FIG. 19, the remainder of the first III-V group compound semiconductor layer 19 and the first semiconductor layer 17 are etched using the second insulating layer mask 37 to form a first semiconductor mesa 39 and a first core layer 41. The first semiconductor mesa 39 includes a p-type cladding layer 43 and a p-type contact layer 45. The first semiconductor mesa 39 includes a stripe portion 39a extending along the first axis Ax1, a tapered portion 39b at one end of the stripe portion 39a, and a tapered portion 39c at the other end of the stripe portion 39a. The tapered portion 39b, the stripe portion 39a, and the tapered portion 39c are disposed along the first axis Ax1.

Figure 20A:
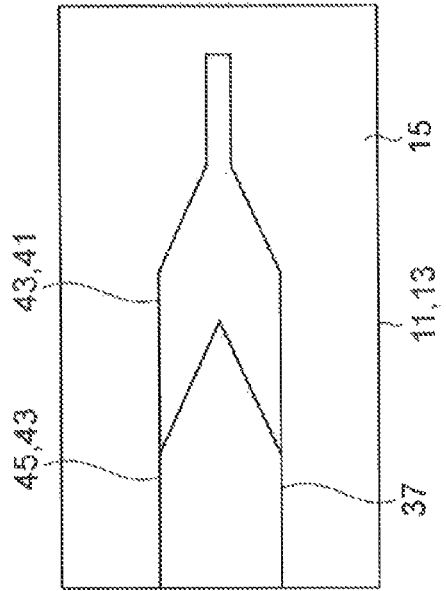
FIGS. 20A, 20B, and 20C are schematic views of steps of a method for manufacturing a semiconductor optical waveguide device according to an embodiment of the present invention.
Figure 20B:
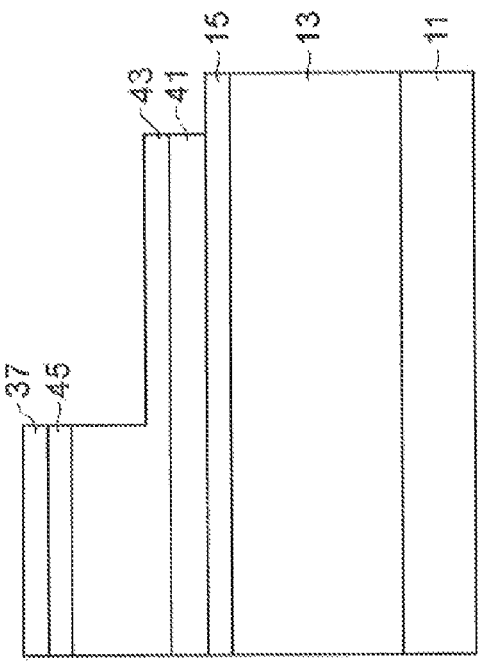
Figure 20C:
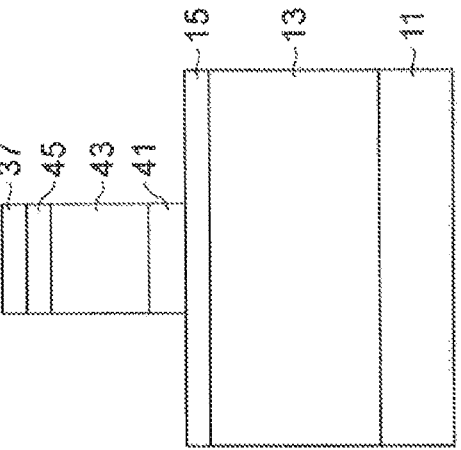

In the present embodiment, as illustrated in FIGS. 20A, 20B, and 20C, the semiconductor layers 19 and 17 are etched to have a depth of 1.2 μm using the SiN film mask (the second insulating layer mask 37) having a shape corresponding to the first semiconductor mesa. The bottom of the first semiconductor mesa 39 remains in the InP cladding layer, and the InP cladding layer still has a thickness of approximately 200 nm. With respect to the shape of the second semiconductor mesa, the first core layer is formed by the etching, and the surface of the InP intermediate layer is exposed. In order to determine the end of etching, gallium (Ga) is monitored with a plasma monitor. Etching is stopped immediately after gallium is not detected. Thus, etching is stopped when the InP intermediate layer is exposed.

Figure 21:
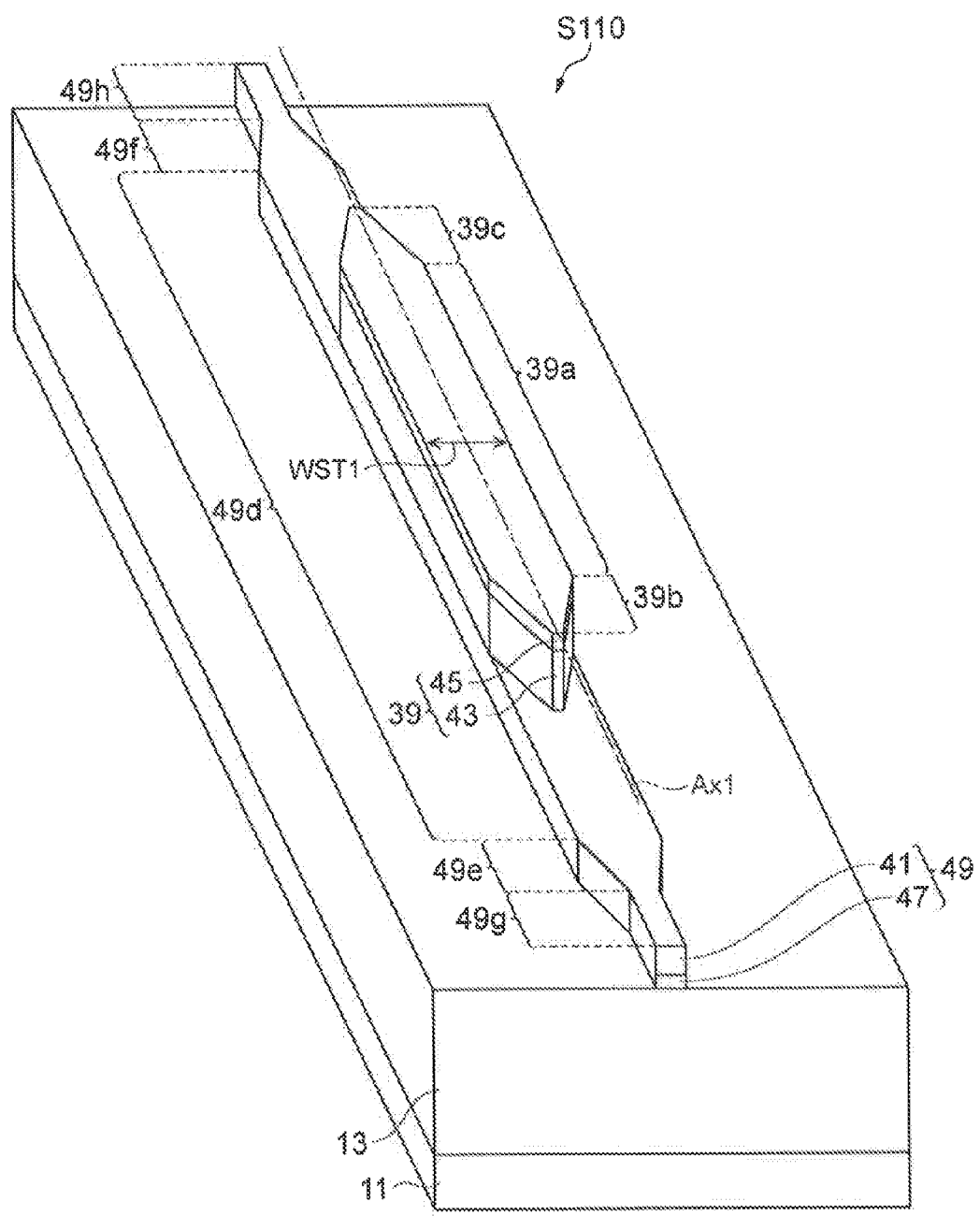
FIG. 21 is a schematic view of step S110 of a method for manufacturing a semiconductor optical waveguide device according to an embodiment of the present invention.

In step S110, as illustrated in FIG. 21, after the formation of the first core layer 41 and the first semiconductor mesa 39, the remainder of the first III-V group compound semiconductor layer 19 and the second III-V group compound semiconductor layer 15 are etched to form an intermediate layer 47. The width of the intermediate layer 47 is substantially the same as the width of the first core layer 41. A second semiconductor mesa 49 includes the intermediate layer 47 and the first core layer 41.

The second semiconductor mesa 49 includes a stripe portion 49d extending along the first axis Ax1, a tapered portion 49e at one end of the stripe portion 49d, and a tapered portion 49f at the other end of the stripe portion 49d. The second semiconductor mesa 49 includes terminal stripe portions 49g and 49h connected to the tapered portions 49e and 49f, respectively. The terminal stripe portions 49g and 49h have a smaller width than that of the stripe portion 49d. The width WST1 of the stripe portion 49d is substantially the same as the widths of the first semiconductor mesa and the second semiconductor mesa. The width of the stripe portion of the second semiconductor mesa 49 (the first semiconductor mesa 39) ranges from approximately 1 to 2 µm. The terminal stripe portions 49g and 49h have a width in the range of approximately 0.3 to 0.8 nm.

Figure 22B:
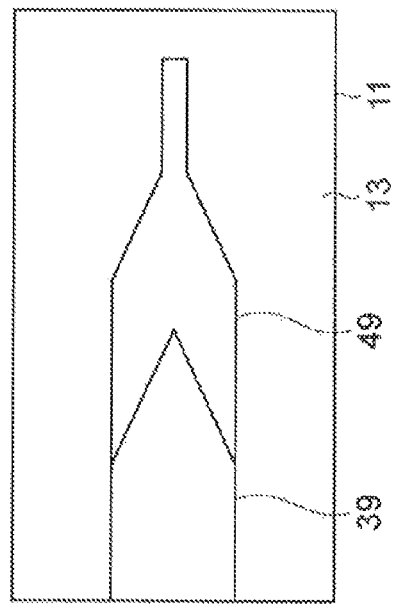
FIGS. 22A, 22B, and 22C are schematic views of steps of a method for manufacturing a semiconductor optical waveguide device according to an embodiment of the present invention.
Figure 22C:
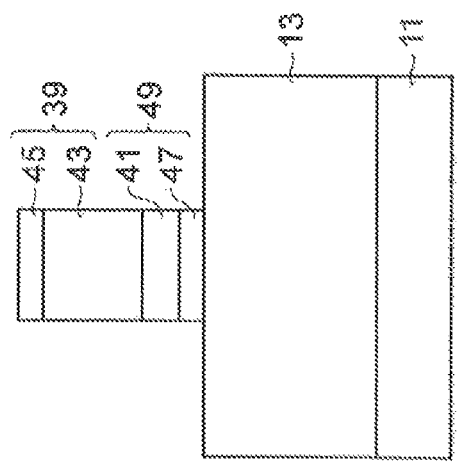
Figure 22A:
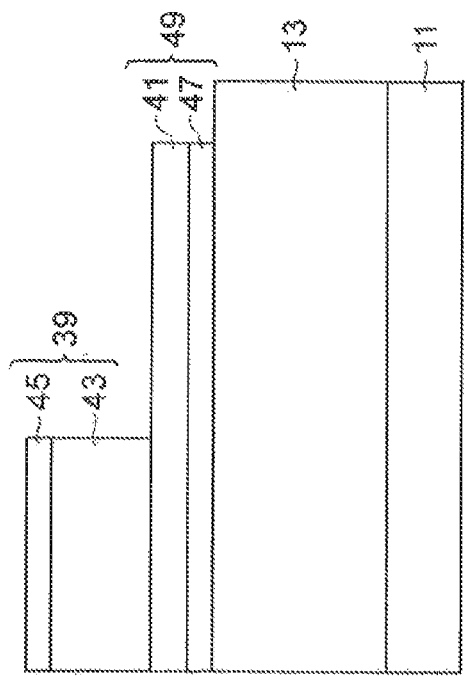

As illustrated in FIGS. 22A, 22B, and 22C, the InP intermediate layer is formed, and the remainder of the InP cladding layer on the second semiconductor mesa is processed. These processing and formation are performed by dry etching using the second insulating layer mask 37. Through these processing and formation, the intermediate layer 47 is formed. Furthermore, the remainder of the cladding layer is completely removed, and the first semiconductor mesa 39 is formed. After the formation of the intermediate layer 47 and the first semiconductor mesa 39, the second insulating layer mask 37 is removed.

In this embodiment, the InP layer having a thickness of 200 nm is further etched to completely remove the remainder of the cladding layer on the second semiconductor mesa. Concurrently, the intermediate layer 47 is processed. This results in the formation of the second semiconductor mesa 49.

In this method of manufacturing a semiconductor optical waveguide device, the level difference 29a having a shape corresponding to the shape of the first mask is formed by etching the insulating layer 25, and the patterned insulating layer 29 including the thick-film portion 29b and the thin-film portion 29c is formed. The patterned insulating layer 29 including the level difference 29a is further processed to form the first insulating layer mask 35, which defines the shape of the second semiconductor mesa 49. The stacked semiconductor layer 23 is etched using the first insulating layer mask 35 to form a mesa. After the etching of the stacked semiconductor layer 23 using the first insulating layer mask 35, the second insulating layer mask 37 that defines the shape of the first semiconductor mesa 39 is formed utilizing the difference in film thickness in the first insulating layer mask 35.

Figure 23:
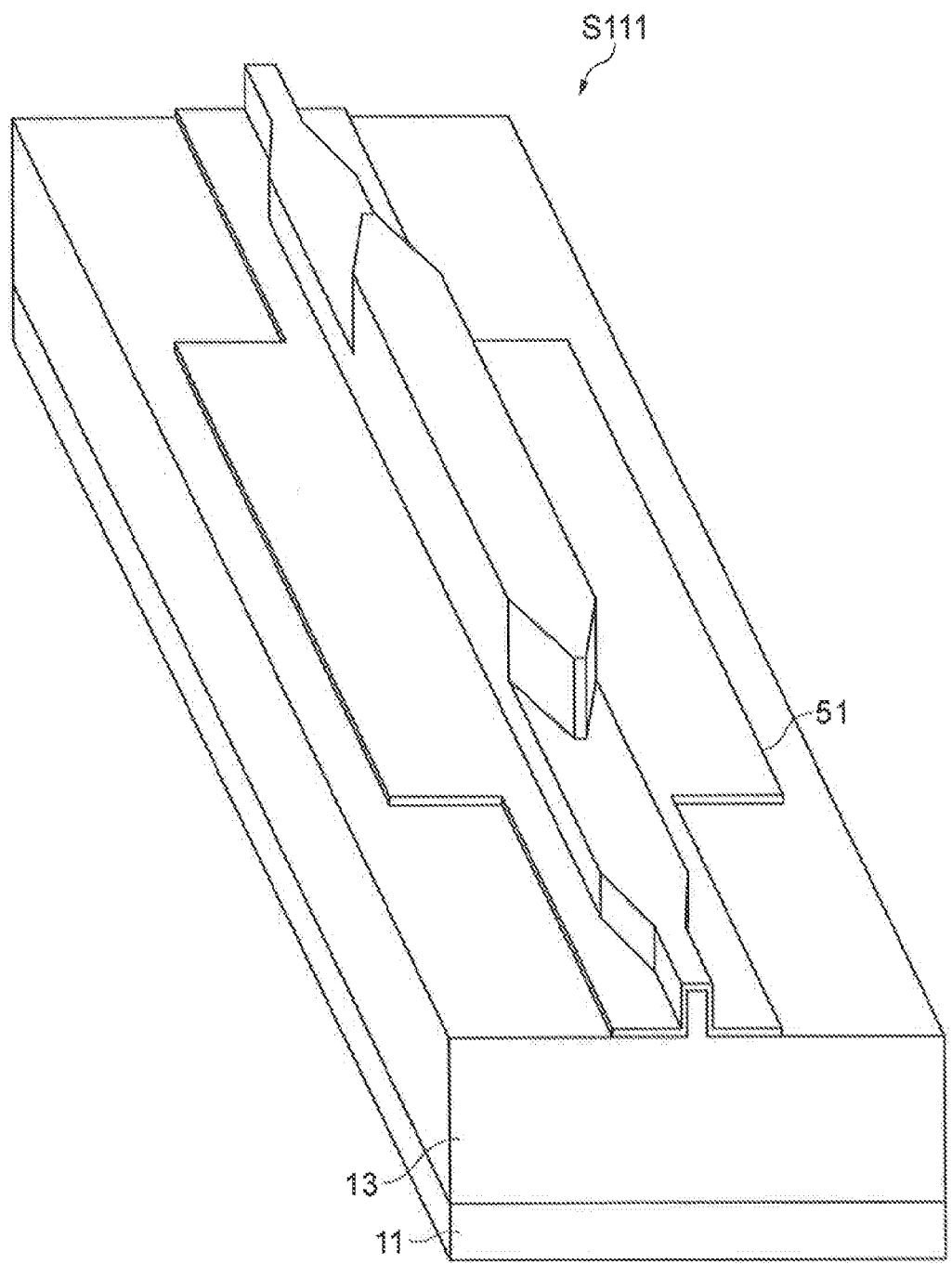
FIG. 23 is a schematic view of step S111 of a method for manufacturing a semiconductor optical waveguide device according to an embodiment of the present invention.

In step S111, as illustrated in FIG. 23, after the formation of the second semiconductor mesa 49, a fourth insulating layer mask 51 that defines a third semiconductor mesa is formed. The width of a spot size converter in the third semiconductor mesa ranges from approximately 4 to 6 µm.

Figure 24A:
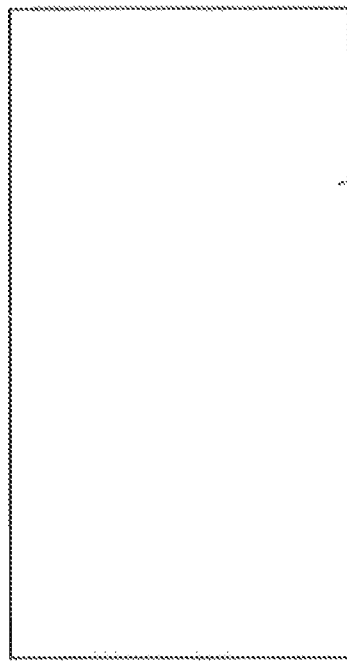
FIGS. 24A, 24B, and 24C are schematic views of steps of a method for manufacturing a semiconductor optical waveguide device according to an embodiment of the present invention.
Figure 24B:
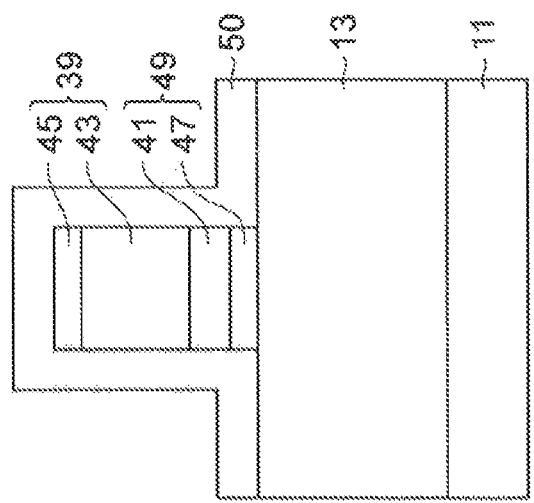
Figure 24C:
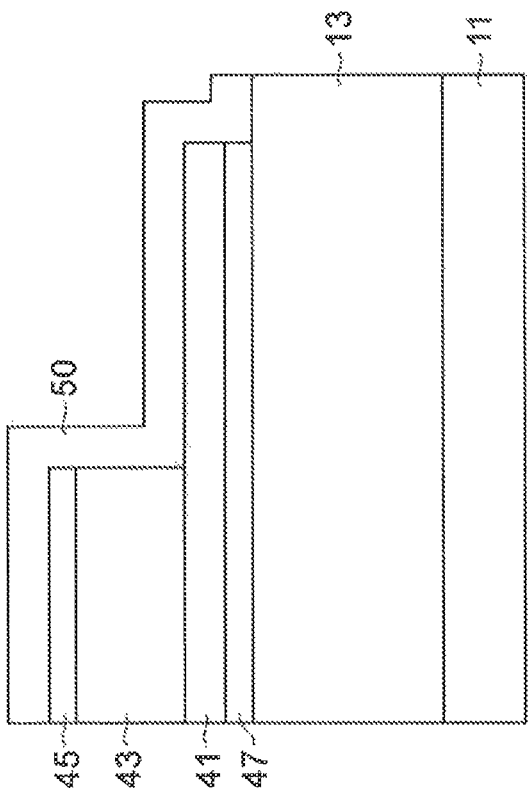

In the present embodiment, the fourth insulating layer mask 51 is made of, for example, silicon nitride (SiN) or silicon dioxide (SiO$_2$). As illustrated in FIGS. 24A, 24B, and 24C, a SiN film 50, for example, having a thickness of 250 nm is formed. As illustrated in FIGS. 25A, 25B, and 25C, a resist 52 is applied on the SiN film 50. As illustrated in FIGS. 26A, 26B, and 26C, a resist mask 54 is formed by using photolithography method. As illustrated in FIGS. 27A, 27B, and 27C, a SiN mask (the fourth insulating layer mask 51) that defines the third semiconductor mesa is formed by etching using the resist mask 54. The fourth insulating layer mask 51 has a width of approximately 5 µm. The third semiconductor mesa having a width of approximately 5 µm is formed by etching the semiconductor layer 13 using the fourth insulating layer mask 51. The fourth insulating layer mask 51 covers the second semiconductor mesa 49. The fourth insulating layer mask 51 also covers a portion of the semiconductor layer 13 having a width of approximately 2 µm from each side surface of the second semiconductor mesa 49. Thus, the fourth insulating layer mask 51 is formed with high precision. As illustrated in FIGS. 28A, 28B, and 28C, the resist mask is removed to expose the SiN mask (the fourth insulating layer mask 51).

Figure 29:
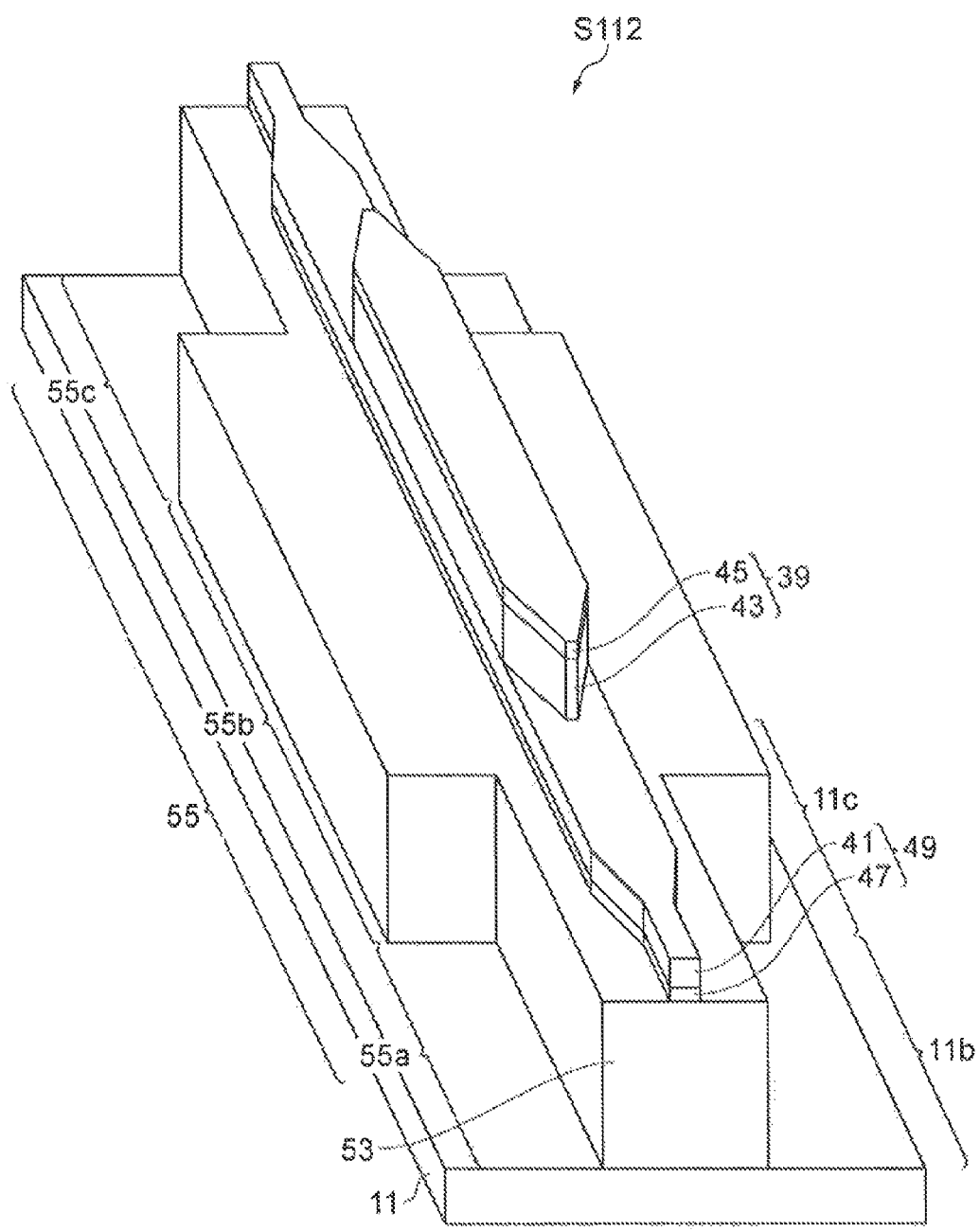
FIG. 29 is a schematic view of step S112 of a method for manufacturing a semiconductor optical waveguide device according to an embodiment of the present invention.

In step S112, as illustrated in FIG. 29, a third semiconductor mesa 55 including a second core layer 53 is formed by etching the semiconductor layer 13 using the fourth insulating layer mask 51. In this method, the formation of the second semiconductor mesa 49 is followed by the formation of the third semiconductor mesa 55. Thus, the spot size converter can be realized as a result of vertical optical propagation. The third semiconductor mesa 55 includes a first portion 55a and a third portion 55c, each of which has an end face to be optically-coupled to an external optical waveguide such as an optical fiber. The third semiconductor mesa 55 also includes a second portion 55b, on which an electrode for processing, such as optical modulation, of light propagating through the first semiconductor mesa 39 and the second semiconductor mesa 49 is formed. The second portion 55b has a greater width than the first portion 55a and the third portion 55c.

Figure 30B:
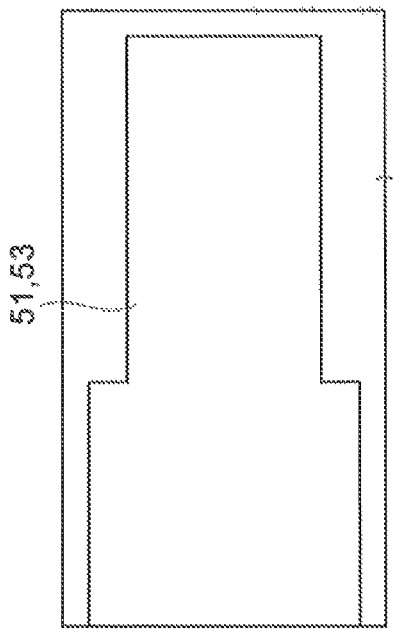
FIGS. 30A, 30B, and 30C are schematic views of steps of a method for manufacturing a semiconductor optical waveguide device according to an embodiment of the present invention.
Figure 30C:
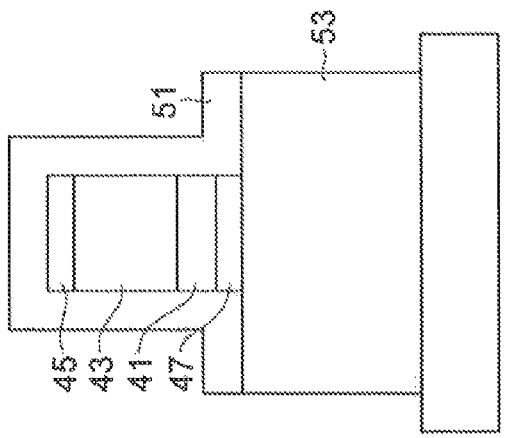
Figure 30A:
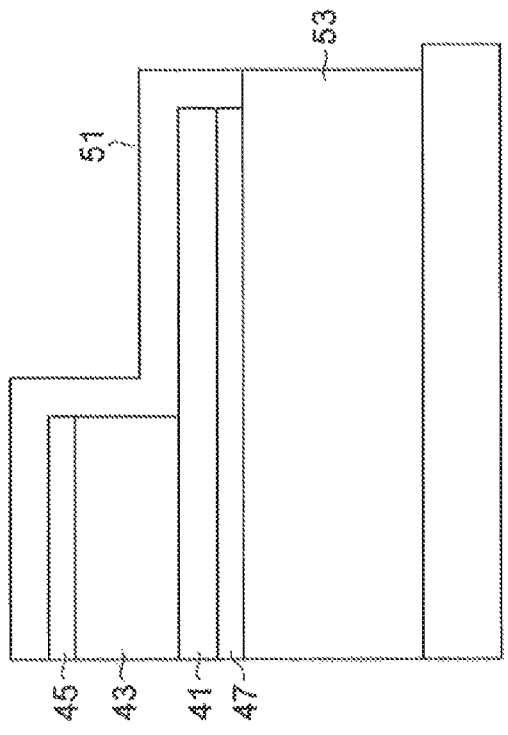
Figure 31B:
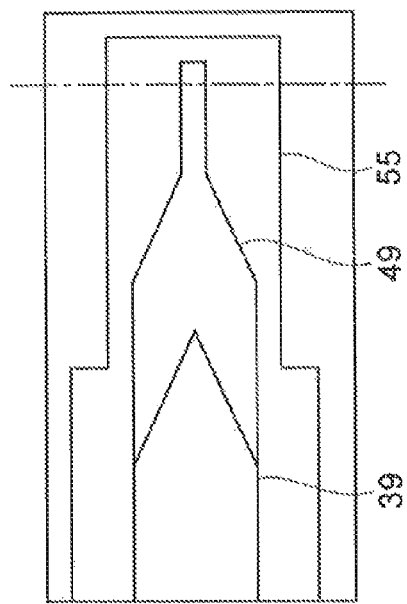
FIGS. 31A, 31B, and 31C are schematic views of steps of a method for manufacturing a semiconductor optical waveguide device according to an embodiment of the present invention.
Figure 31C:
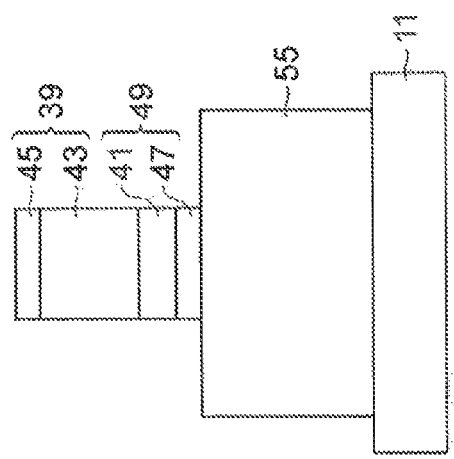
Figure 31A:
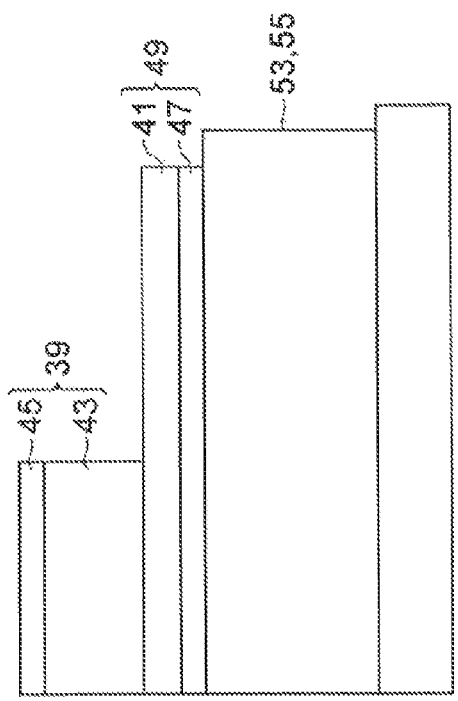

In the present embodiment, as illustrated in FIGS. 30A, 30B, and 30C, a Ga signal is monitored with a plasma monitor during the formation of the second core layer 53 by etching, and the etching is stopped when the Ga signal is not detected. Thus, the etching is easily stopped at the bottom of the second core layer 53. After the etching, as illustrated in FIGS. 31A, 31B, and 31C, the SiN mask is removed with buffered hydrofluoric acid to remove the insulating layer mask, for example.

Figure 32:
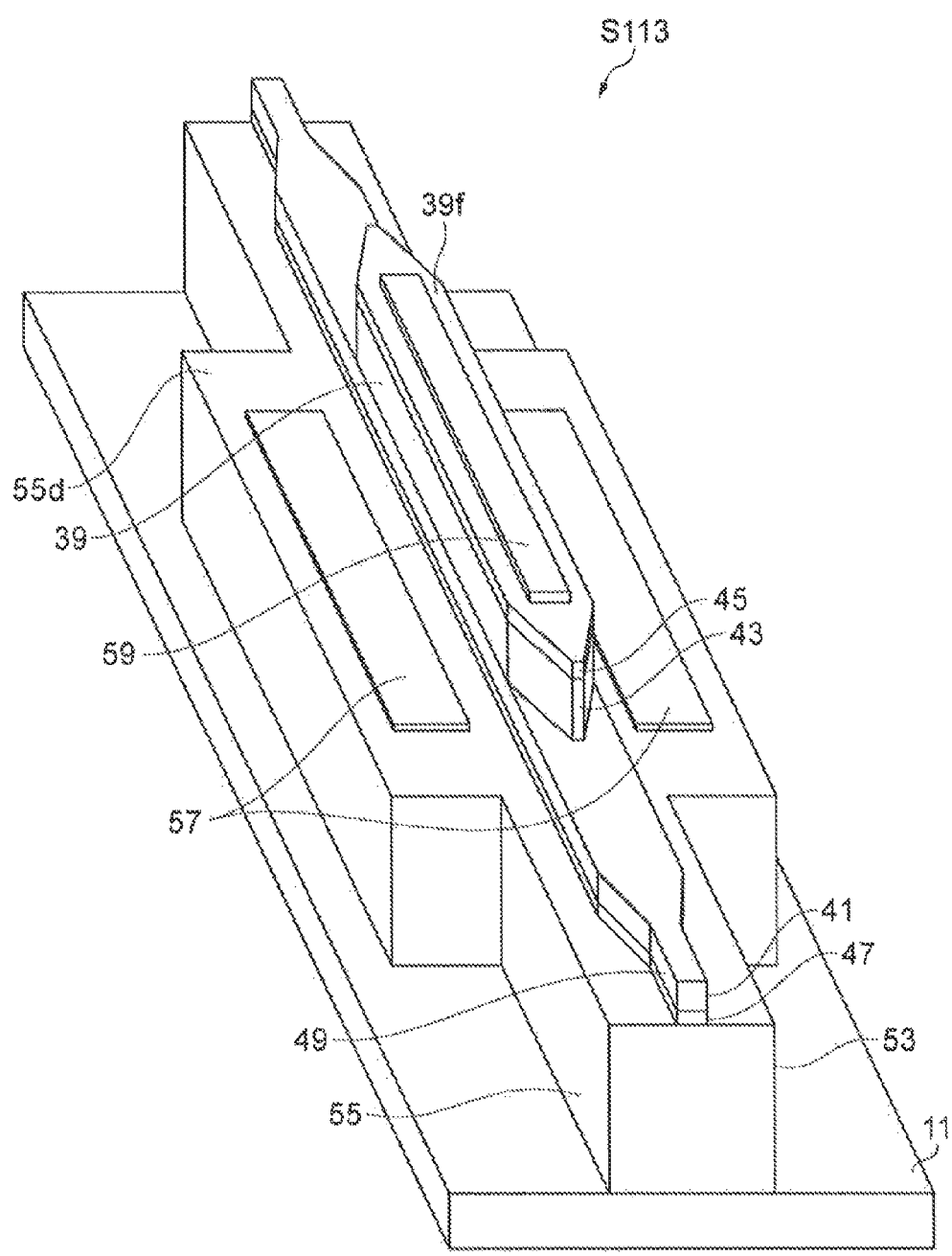
FIG. 32 is a schematic view of step S113 of a method for manufacturing a semiconductor optical waveguide device according to an embodiment of the present invention.

In step S113, as illustrated in FIG. 32, first electrodes 57 are formed on the top surface 55d of the third semiconductor mesa 55. A second electrode 59 is formed on the top surface 39f of the first semiconductor mesa 39. In this structure formed by using above method, light propagating through the first core layer 41 is modulated by applying an electrical signal to the first electrodes 57 and the second electrode 59. As described above, in this method, the substrate 11 is formed of InP, the intermediate layer 47 is formed of n-type InP, and the cladding layer 43 is formed of p-type InP.

Figure 33B:
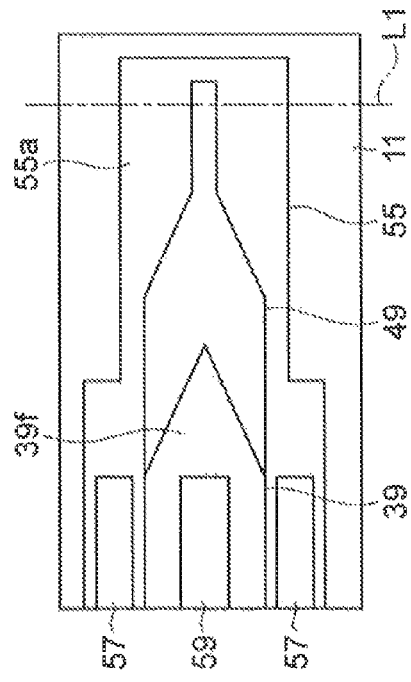
FIGS. 33A, 33B, and 33C are schematic views of steps of a method for manufacturing a semiconductor optical waveguide device according to an embodiment of the present invention.
Figure 33C:
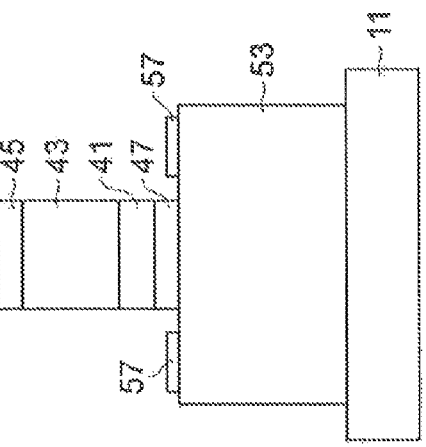
Figure 33A:
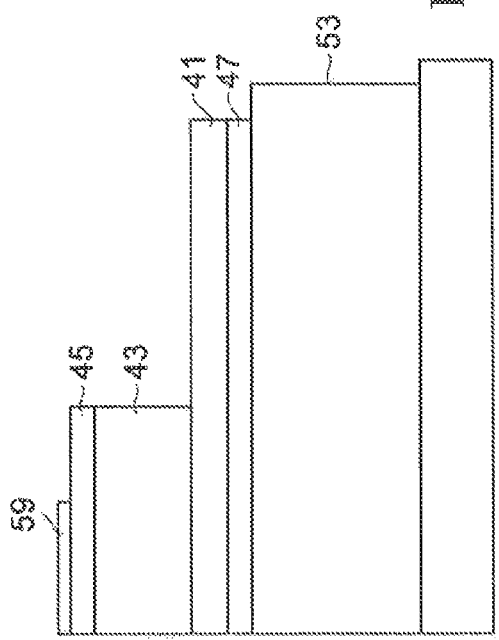

In one embodiment, as illustrated in FIGS. 33A, 33B, 33C, a p-electrode 59 is formed on the top surface 39f of the first semiconductor mesa 39 using a lift-off method. In the same manner, an n-electrode 57 is formed on the top surface 55d of the third semiconductor mesa 55 using a lift-off method. The semiconductor waveguide device is obtained by cleaving the substrate along the broken line L1 in FIG. 33B. In the present embodiment, the semiconductor waveguide device is an optical modulator that is configured to perform the optical phase modulation of light propagating through the first core layer 41.

In a semiconductor waveguide device manufactured as described in FIGS. 1 to 33C, the first core layer 41 in the second semiconductor mesa 49 is configured to perform optical modulation in response to an electrical signal applied through the first electrodes 57 and the second electrode 59. In this semiconductor optical waveguide device, light propagating through the first core layer 41 is modulated by applying the electrical signal between the first electrodes 57 and the second electrode 59.

The linear stripe portions of the first semiconductor mesa 39 and the second semiconductor mesa 49 constitute an optical modulator. An embodiment illustrated in FIGS. 34A and 34B includes a Mach-Zehnder (MZ) type modulator 69. As illustrated in FIG. 34A, the Mach-Zehnder (MZ) type modulator 69 includes a spot size converter at each end of a semiconductor waveguide device. A first semiconductor mesa between the two spot size converters includes a 1×2 multinode interference (MMI) coupler 61, two arm waveguides 63 and 65, and a 1×2 multimode interference (MMI) coupler 67. In the present embodiment, each of the arm waveguides has a width of 2 µm or less to obtain a single transverse mode. A p-type InP layer, a first core layer, and a n-type InP intermediate layer are included in mesas having the same stripe width, and their side surfaces are vertically aligned. In this structure, the parasitic capacitance of the arm waveguide (that is, a parasitic capacitance between the n-type InP intermediate layer and the p-type in P layer) is reduced. In the method and process flows illustrated in FIGS. 1 to 33, by using a mask having a desired pattern, a structure including two semiconductor mesas each having flat side surfaces is obtained, as illustrated in FIG. 34B.

Preferred embodiments of the present invention will be described below with reference to FIGS. 35 to 37. In the step S110 described above, after the formation of the first core layer 41 and the first semiconductor mesa 39, the remainder of the first III-V group compound semiconductor layer 19 and the second III-V group compound semiconductor layer 15 are etched to form the intermediate layer 47. The width of the intermediate layer 47 is substantially the same as the width of the first core layer 41. The second semiconductor mesa 49 includes the intermediate layer 47 and the first core layer 41.

In this method, a variation in etch depth in the step S110 may result in a misalignment between the bottom of the first semiconductor mesa and the interface between the first core layer and the cladding layer. Such a variation may also result in a misalignment between the bottom of the second semiconductor mesa and the interface between the second core layer and the intermediate layer. Even using a plasma monitor for monitoring Ga to stop etching, there is a limit to further improvement in precision.

A semiconductor waveguide device that requires more strict process control is preferably manufactured using the following method as illustrated in FIGS. 35A to 36C.

In an initial step of a process for forming an intermediate layer, as illustrated in FIGS. 35A, 35B, and 35C, an insulating layer 71 is formed on the side surfaces of the first semiconductor mesa 39 and on the second insulating layer mask 37 and the substrate 11. In the embodiment, the insulating layer 71 is a second insulating layer. On the top surface of the first semiconductor mesa 39, the insulating layer 71 covers the second insulating layer mask 37.

Figure 36A:
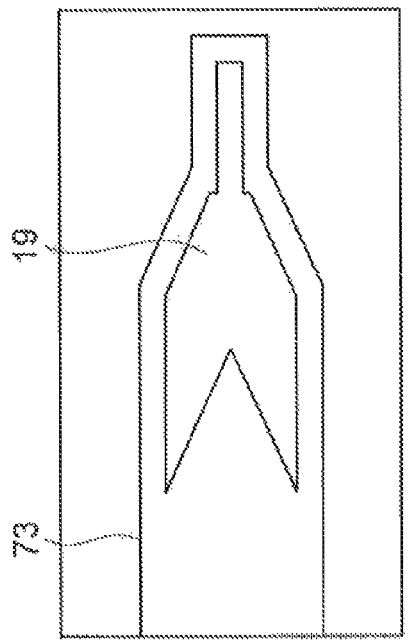
FIGS. 36A, 36B, and 36C are schematic views of steps of a method for manufacturing a semiconductor optical waveguide device according to an embodiment of the present invention.
Figure 36B:
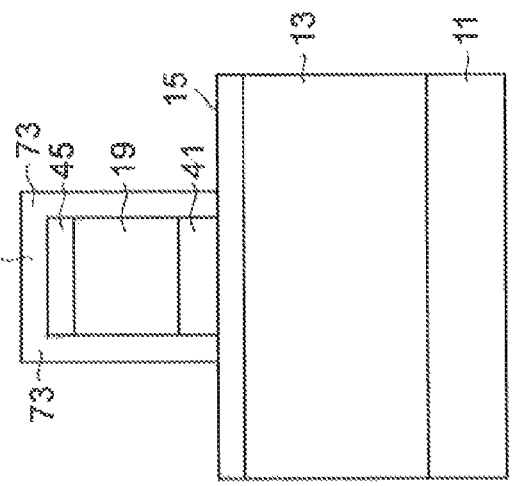
Figure 36C:
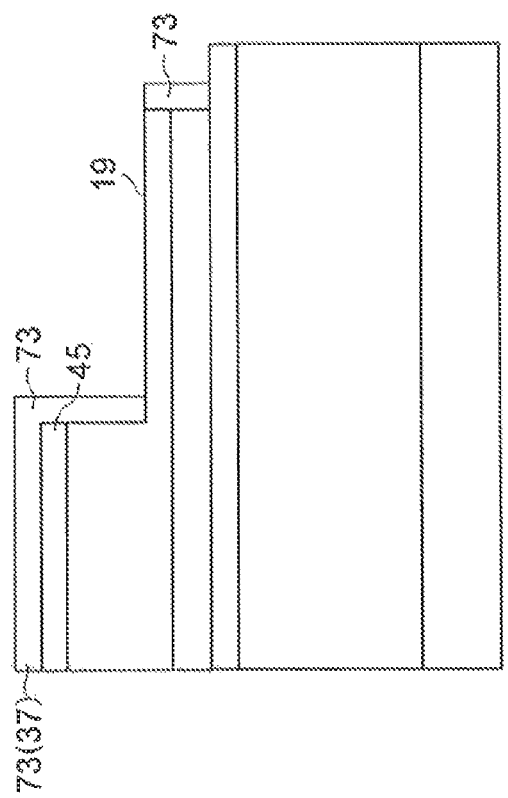

In the subsequent step, the insulating layer 71 is etched to expose the second insulating layer mask 37 over the entire surface of the substrate. By the etching, the remainder of the first III-V group compound semiconductor layer 19 on the first core layer 41 and the second III-V group compound semiconductor layer 15 on the second semiconductor layer 13 are exposed. An insulating layer mask 73 is formed in the same step. In the embodiment, the insulating layer mask 73 is a third insulating layer mask. As illustrated in FIGS. 36A, 36B, and 36C, the insulating layer mask 73 covers the top surface and side surfaces of the first semiconductor mesa 39 and the side surfaces of the first core layer 41.

Figure 37A:
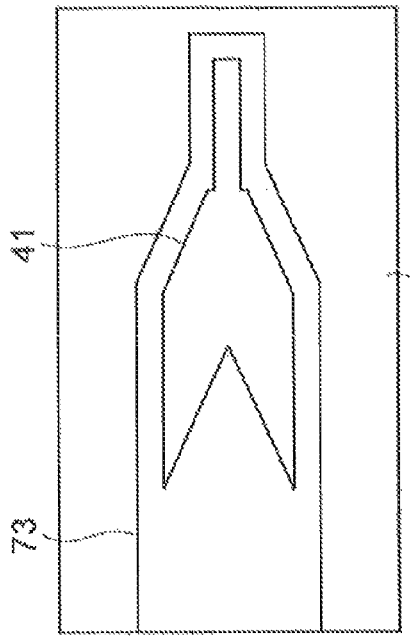
FIGS. 37A, 37B, and 37C are schematic views of steps of a method for manufacturing a semiconductor optical waveguide device according to an embodiment of the present invention.
Figure 37B:
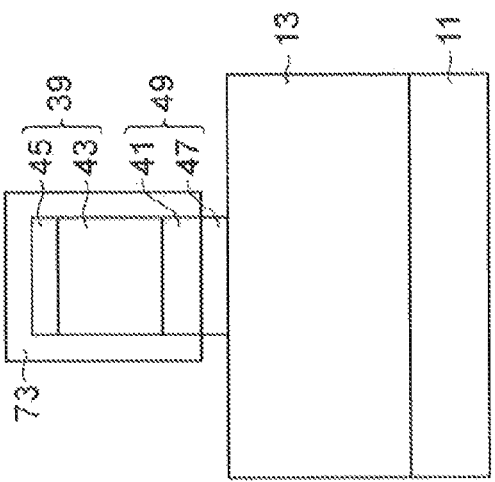
Figure 37C:
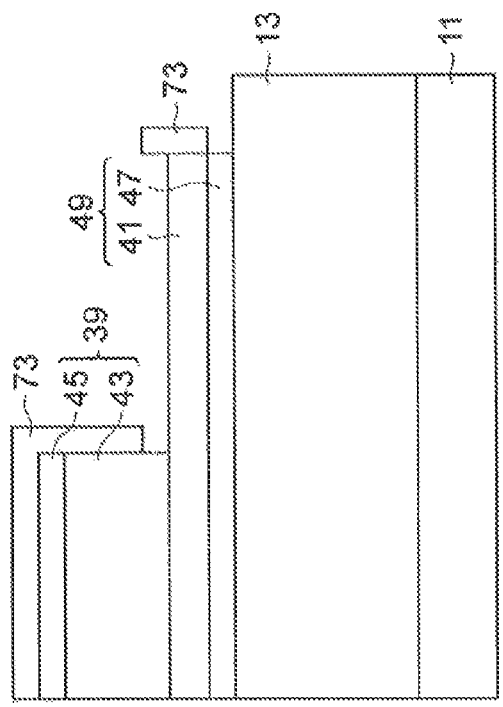

In the subsequent step, as illustrated in FIGS. 37A, 37B, and 37C, the remainder of the first III-V group compound semiconductor layer 19 on the first core layer 41 and the second III-V group compound semiconductor layer 15 on the second semiconductor layer 13 are wet-etched using the insulating layer mask 73 to form the second semiconductor mesa 49.

After that, the insulating layer mask 73 is removed.

In this method for manufacturing a semiconductor optical waveguide device, the remainder of the first III-V group compound semiconductor layer 19 and the second III-V group compound semiconductor layer 15 are selectively removed by wet etching using the insulating layer mask 73.

Thus, the bottom of the first semiconductor mesa 39 is precisely aligned with the interface between the first core layer 41 and the cladding layer 43. Furthermore, the bottom of the second semiconductor mesa 49 is aligned with the interface between the second core layer 53 and the intermediate layer 47.

In the present embodiment, a film having a thickness of 250 nm is formed on the entire surface of the substrate while a SiN mask that defines the first semiconductor mesa remains. The SiN film having a thickness of 250 nm is then dry-etched using $CF_4$ gas. The etching leaves the SiN film on the side surfaces of the second semiconductor mesa and the side surfaces and top surface of the first semiconductor mesa. During the formation of the mesa stripes, the InP cladding layer and the InP intermediate layer are not covered with the SiN film and are exposed at each of the bottoms of the mesa stripes.

After the etching of the entire surface of the SiN film, the exposed InP is removed by wet etching using a liquid mixture of hydrochloric acid and acetic acid, InP is selectively etched with the liquid mixture of hydrochloric acid and acetic acid, InGaAsP, AlInAs, and AlGaInAs that are material constituting the first core layer and the second core layer are hardly etched with the liquid mixture of hydrochloric acid and acetic acid. Thus, etching stops precisely at the top surface of the first core layer and the top surface of the second core layer.

Because of variations in etching shape during wet etching, however, the mesa shape in a lower portion of the InP cladding layer in a tapered portion of the first semiconductor mesa and the mesa shape in the InP intermediate layer of the second semiconductor mesa may be different from a desired shape. However, these variations in etching shape during wet etching do not significantly affect the characteristics of the optical waveguide because the first core layer, in which guided light is mainly confined, has a desired shape. After the wet etching, the residual SiN film is removed with buffered hydrofluoric acid.

These additional steps allow the precise formation of the semiconductor mesa.

The semiconductor optical waveguide device according to the present embodiment includes the spot size converter, which includes the first semiconductor mesa having the tapered portions, the second semiconductor mesa having the tapered portions, and the third semiconductor mesa. Furthermore, the first core layer is used to constitute an optical modulator. The first semiconductor mesa and the second semiconductor mesa constitute a semiconductor mesa for performing signal processing, such as modulation, of guided light in response to an electrical signal. The side surfaces of these mesas are aligned in each side surface. Accordingly, a change in light intensity distribution in the optical waveguide is suppressed. In addition, a parasitic capacitance in the semiconductor mesa for performing signal processing such as optical modulation is also reduced. The p-type cladding layer and the n-type intermediate layer are separated from each other by the first core layer and are capacitively-coupled to each other. The p-type cladding layer is disposed in the first semiconductor mesa, and the n-type intermediate layer is disposed in the second semiconductor mesa. The first semiconductor mesa and the second semiconductor mesa have the same width. Therefore, the parasitic capacitance between the p-type cladding layer and the n-type intermediate layer is reduced.

In the optical modulator including the spot size converter in the embodiment, a terrace portion is not formed in the first core layer adjacent to the linear portion of the first semiconductor mesa. Therefore, optical and electrical characteristics related to the light intensity distribution and the parasitic capacitance are improved. In the present embodiment, the semiconductor optical waveguide device including the modulator has improved high-speed modulation characteristics. A structure having no terrace portion in the first core layer extending over the linear waveguide portion of the first semiconductor mesa is formed using the method for manufacturing the semiconductor optical waveguide device including the spot size converter. This manufacturing method can reduce wafer in-plane variations in width of a narrow portion of the second semiconductor mesa.

Figure 38:
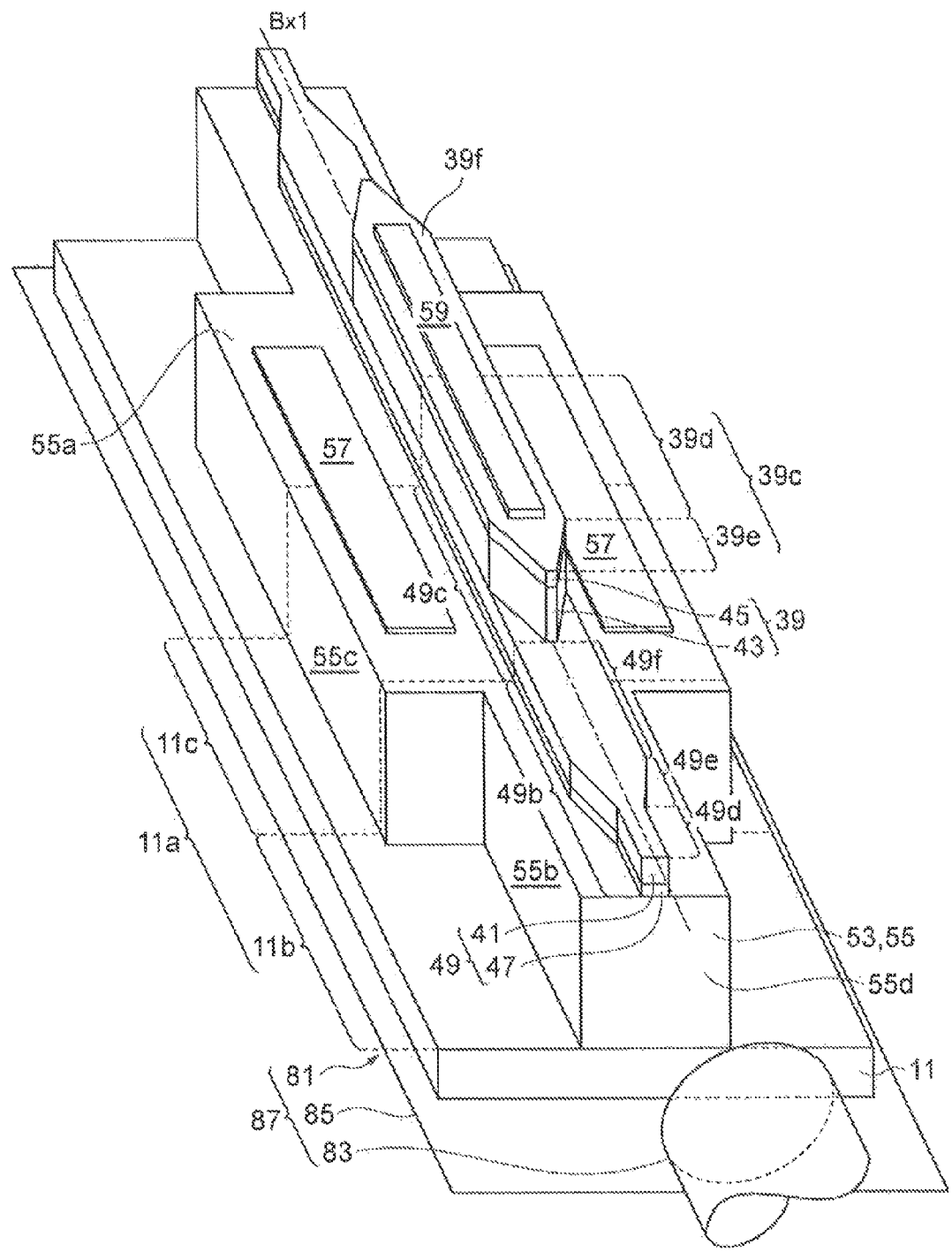
FIG. 38 is a schematic view of a semiconductor optical waveguide device and a semiconductor optical waveguide apparatus according to another embodiment of the present invention.

FIG. 38 illustrates a semiconductor optical waveguide apparatus 87 according to the present embodiment. The semiconductor optical waveguide apparatus 87 includes a semiconductor optical waveguide device 81, an external optical waveguide 83, and a support 85 for supporting the semiconductor optical waveguide device 81 and the external optical waveguide 83. The semiconductor optical waveguide device 81 includes a substrate 11, a first semiconductor mesa 39, a second semiconductor mesa 49, and a third semiconductor mesa 55. The substrate 11 has a principal surface 11a. The substrate 11 is made of a III-V group compound semiconductor such as InP. The first semiconductor mesa 39 includes a cladding layer 43 formed of a first III-V group compound semiconductor and a contact layer 45 formed of a third MAT group compound semiconductor. The second semiconductor mesa 49 includes an intermediate layer 47 formed of a second III-V group compound semiconductor and a first core layer 41. The third semiconductor mesa 55 includes a second core layer 53. The first semiconductor mesa 39 is disposed on the second semiconductor mesa 49. The second semiconductor mesa 49 is disposed on the third semiconductor mesa 55. The third semiconductor mesa 55 is disposed on the principal surface 11a of the substrate 11. The principal surface 11a of the substrate 11 includes the first area 11b and the second area 11c along a first axis Bx1.

The third semiconductor mesa 55 includes a first mesa portion 55b and a second mesa portion 55c. The first mesa portion 55b of the third semiconductor mesa 55 is disposed on the first area 11b. The second mesa portion 55c of the third semiconductor mesa 55 is disposed on the second area 11c. In the third semiconductor mesa 55, the width of the first mesa portion 55b is different from the width of the second mesa portion 55c. The second semiconductor mesa 49 includes a first mesa portion 49b and a second mesa portion 49c. The first mesa portion 49b of the second semiconductor mesa 49 is disposed on top of the first area 11b. The second mesa portion 49c is disposed on top of the second area 11c. The first semiconductor mesa 39 includes a first mesa portion 39c disposed on top of the second area 11c. The first mesa portion 39c of the first semiconductor mesa 39 includes a first portion 39d having substantially the same width as the second mesa portion 49c of the second semiconductor mesa 49 and a second portion 39e having a smaller width than the first portion 39d. The first mesa portion 39c of the first semiconductor mesa 39 has a tapered shape.

The intermediate layer 47 is disposed between the first core layer 41 and the second core layer 53. The first core layer 41 is optically-coupled to the second core layer 53. The first mesa portion 55b of the third semiconductor mesa 55 has an end face 55d that is optically-coupled to the external optical waveguide 83. The end face 55d is flush with an end facet of the substrate 11. The width of the first mesa portion 55b and the width of the second mesa portion 55c of the third semiconductor mesa 55 are greater than the width of the second semiconductor mesa 49. The second mesa portion 49c of the second semiconductor mesa 49 and the first mesa portion 39c of the first semiconductor mesa 39 extend along the axis Bx1. The portion 49c of the second semiconductor mesa 49 has a width of a single mode waveguide in which only a fundamental transverse mode can propagate. The first portion 39d of the first mesa portion 39c of the first semiconductor mesa 39 also has a width of the single mode waveguide.

In the semiconductor optical waveguide device 81, the first mesa portion 55b of the third semiconductor mesa 55 has an end face 55d for optical coupling. The end face 55d is flush with an end facet of the substrate 11. The end face 55d is optically-coupled to the external optical waveguide 83, such as a single-mode optical fiber. That is, the end face 55d receives an input light from the external optical waveguide 83. The width of the first mesa portion 55b and the width of the second mesa portion 55c of the third semiconductor mesa 55 are greater than the width of the second semiconductor mesa 49 in the semiconductor optical waveguide device 81. Thus, the mode field diameter (MFD) of an optical waveguide included in the third semiconductor mesa 55 is the same as or similar to the mode field diameter of the external optical waveguide 83.

The width of the second semiconductor mesa 49 is smaller than the width of the first mesa portion 55b and the width of the second mesa portion 55c of the third semiconductor mesa 55. The first core layer 41 is optically-coupled to the second core layer 53. Thus, light propagates from the first core layer 41 to the second core layer 53 or from the second core layer 53 to the first core layer 41.

The first core layer 41 is optically-coupled to the second core layer 53 via the intermediate layer 47. Thus, the first core layer 41 can constitute a different optical waveguide structure from that of the second core layer 53. Such an optical waveguide structure can perform desired optical processing of guided light using the first core layer 41.

The second mesa portion 49c of the second semiconductor mesa 49 and the first mesa portion 39c (39d) of the first semiconductor mesa 39 have a width of the single mode waveguide in which only a fundamental transverse mode can propagate. The first mesa portion 39c (39d) of the first semiconductor mesa 39 includes a portion having the same width as the second mesa portion 49c of the second semiconductor mesa 49. Thus, the intermediate layer 47, the first core layer 41, and the cladding layer 43 in the first portion 39d of the first mesa portion 39c of the first semiconductor mesa 39 and the second mesa portion 49c of the second semiconductor mesa 49 constitute an optical waveguide structure having a constant width. The first mesa portion 39c of the first semiconductor mesa 39 includes the second portion 39e on the second mesa portion 49c of the second semiconductor mesa 49. The second portion 39e has a smaller width than the first portion 39d of the first mesa portion 39c. Thus, the narrow second portion 39e terminates the optical waveguide without reflection of light passing through the first core layer 41 at the end of the optical waveguide. Therefore, return light coupling again into the first core layer 41 at the end of the optical waveguide is reduced. Hence, the optical waveguide structure can stably perform optical waveguiding using the first core layer 41 and optical processing using the first core layer 41.

The refractive index of the intermediate layer 47 is smaller than the average refractive index of the first core layer 41 and the average refractive index of the second core layer 53. The average refractive index of a core layer composed of a single semiconductor layer corresponds to the refractive index of the semiconductor layer. The average refractive index of a core layer having a multi-quantum well (MQW) structure is calculated using the following equation. Average refractive index=(Refractive index of well layer×Total thickness of well layers+Refractive index of barrier layer×Total thickness of barrier layers)(Total thickness of well layers+Total thickness of barrier layers).

The semiconductor optical waveguide device 81 further includes first electrodes 57 on the top surface 55a of the second mesa portion 55c of the third semiconductor mesa 55. The semiconductor optical waveguide device 81 further includes a second electrode 59 on the top surface 39f of the first semiconductor mesa 39. The width of the first mesa portion 55b of the third semiconductor mesa 55 is smaller than the width of the second mesa portion 55c. In the semiconductor optical waveguide device 81, light propagating through the first core layer 41 is processed using the first electrodes 57 and the second electrode 59.

The second III-V group compound semiconductor of the intermediate layer 47 is of a first conductive type (for example, n-type). The first III-V group compound semiconductor of the cladding layer 43 is of a second conductive type (for example, p-type). The contact layer 45 is also of a second conductive type (for example, p-type). In the semiconductor optical waveguide device 81, light propagating through the first core layer 41 is optically processed using the first electrodes 57 and the second electrode 59.

In the second mesa portion 49c of the second semiconductor mesa 49, the first core layer 41 is configured to perform optical modulation in response to an electrical signal applied to the first electrodes 57 and the second electrode 59. In the semiconductor optical waveguide device 81, light propagating through the first core layer 41 is modulated using the first electrodes 57 and the second electrode 59.

The first mesa portion 49b of the second semiconductor mesa 49 includes a first portion 49d, a tapered second portion 49e, and a third portion 49f. The first portion 49d has a smaller width than the second mesa portion 49c of the second semiconductor mesa 49. The width of the tapered second portion 49e gradually changes from the width of the first portion 49d to the width of the second mesa portion 49c. The third portion 49f has substantially the same width as the second mesa portion 49c.

In the semiconductor optical waveguide device 81, the first mesa portion 49b of the second semiconductor mesa 49 includes the first portion 49d (having a smaller width than the second mesa portion 49c of the second semiconductor mesa 49) and the second portion 49e (a tapered portion having a width that gradually changes from the width of the first portion 49d to the width of the second mesa portion 49c). This allows light to propagate easily between the first core layer 41 and the second core layer 53.

These embodiments can provide a semiconductor optical waveguide device including a spot size converter and a method for manufacturing the semiconductor optical waveguide device.

Principles of the present invention have been described on the basis of preferred embodiments with reference to the drawings. However, those skilled in the art will understand that the embodiments can be changed in terms of details without departing from the principles. Therefore, all the modifications and changes within the scope and the spirit of Claims are claimed as the present invention.

What is claimed is:

1. A semiconductor optical waveguide device, comprising:
a substrate having a first area and a second area disposed along a first axis;
a first semiconductor mesa including a cladding layer and a first mesa portion disposed on the second area, the first mesa portion including a first portion and a second portion having a smaller width than the first portion;
a second semiconductor mesa disposed under the first semiconductor mesa, the second semiconductor mesa including an intermediate layer, a first core layer, a first mesa portion disposed on the first area, and a second mesa portion disposed on the second area; and
a third semiconductor mesa disposed between the second semiconductor mesa and the substrate, the third semiconductor mesa including a second core layer, a first mesa portion disposed on the first area and a second mesa portion disposed on the second area, the first mesa portion of the third semiconductor mesa having an end face thr receiving an input light,
wherein the first portion of the first semiconductor mesa has a substantially same width as the second mesa portion of the second semiconductor mesa,
each of the first and second mesa portions of the third semiconductor mesa has a width greater than a width of the second semiconductor mesa, and
the first core layer is optically coupled to the second core layer through the intermediate layer disposed between the first core layer and the second core layer.

2. The semiconductor optical waveguide device according to claim 1, wherein the cladding layer is formed of a first III-V group compound semiconductor, and
the intermediate layer is formed of a second III-V group compound semiconductor.

3. The semiconductor optical waveguide device according to claim 2, wherein the second III-V group compound semiconductor of the intermediate layer has a first conductive type, and the first III-V group compound semiconductor of the cladding layer has a second conductive type.

4. The semiconductor optical waveguide device according to claim 1, wherein the second mesa portion of the second semiconductor mesa and the first mesa portion of the first semiconductor mesa extend along the first axis, and
the second mesa portion of the second semiconductor mesa and the first mesa portion of the first semiconductor mesa have a width of a single mode waveguide.

5. The semiconductor optical waveguide device according to claim 1, further comprising:
a first electrode disposed on a surface of the second mesa portion of the third semiconductor mesa; and
a second electrode disposed on a surface of the first semiconductor mesa,
wherein the first mesa portion of the third semiconductor mesa has a smaller width than the second mesa portion of the third semiconductor mesa.

6. The semiconductor optical waveguide device according to claim 5, wherein in the second mesa portion of the second semiconductor mesa, the first core layer constitutes an optical modulator that modulates light in response to an electrical signal applied through the first electrode and the second electrode.

7. The semiconductor optical waveguide device according to claim 1, wherein the first mesa portion of the second semiconductor mesa includes a first portion, a tapered second portion, and a third portion, the first portion has a smaller width than the second mesa portion of the second semiconductor mesa, the tapered second portion has a width that gradually changes from the width of the first portion to the width of the second mesa portion of the second semiconductor mesa, the third portion has substantially the same width as the second mesa portion of the second semiconductor mesa.

8. The semiconductor optical waveguide device according to claim 1, wherein the substrate is formed of InP, the intermediate layer is formed of n-type InP, and the cladding layer is formed of p-type InP.

* * * * *